(12) United States Patent
Lee et al.

(10) Patent No.: US 10,958,495 B2
(45) Date of Patent: *Mar. 23, 2021

(54) APPARATUS AND METHOD FOR TRANSMITTING REFERENCE SIGNALS IN WIRELESS COMMUNICATION SYSTEM

(71) Applicant: Samsung Electronics Co., Ltd., Suwon-si (KR)

(72) Inventors: Keonkook Lee, Suwon-si (KR); Suryong Jeong, Yongin-si (KR); Taeyoung Kim, Seoul (KR); Jiyun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,234

(22) Filed: Aug. 5, 2019

(65) Prior Publication Data

US 2019/0363918 A1 Nov. 28, 2019

Related U.S. Application Data

(63) Continuation of application No. 15/564,706, filed as application No. PCT/KR2016/004017 on Apr. 18, 2016, now Pat. No. 10,411,932.

(30) Foreign Application Priority Data

Apr. 17, 2015 (KR) .................. 10-2015-0054654

(51) Int. Cl.
*H04L 27/26* (2006.01)
*H04L 5/00* (2006.01)
(Continued)

(52) U.S. Cl.
CPC ........ *H04L 27/261* (2013.01); *H04B 7/0617* (2013.01); *H04B 7/086* (2013.01);
(Continued)

(58) Field of Classification Search
None
See application file for complete search history.

(56) References Cited

U.S. PATENT DOCUMENTS 9,179,464 B2 * 11/2015 Noh .................. H04L 5/0053
9,554,381 B2 * 1/2017 Park .................. H04W 72/042
(Continued)

FOREIGN PATENT DOCUMENTS

| CN | 102781098 A | 11/2012 |
|---|---|---|
| JP | 2013-502136 A | 1/2013 |
| WO | 2014/098407 A1 | 6/2014 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, 121 pages.
(Continued)

*Primary Examiner* — Hong S Cho

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present invention relates to transmission of a reference signal in a wireless communication system, and an operation method of a terminal comprises the steps of: receiving control information for reference signals from a base station, and receiving the reference signals according to the control
(Continued)

information. Further, the present invention also comprises embodiments different from the embodiment described above.

20 Claims, 38 Drawing Sheets

(51) Int. Cl.
*H04L 1/00* (2006.01)
*H04B 7/06* (2006.01)
*H04B 7/08* (2006.01)
*H04B 7/0452* (2017.01)

(52) U.S. Cl.
CPC ............... *H04L 1/00* (2013.01); *H04L 5/005* (2013.01); *H04L 5/0016* (2013.01); *H04L 5/0044* (2013.01); *H04L 5/0048* (2013.01); *H04L 5/0091* (2013.01); *H04B 7/0452* (2013.01); *H04L 5/0007* (2013.01); *H04L 5/0023* (2013.01)

(56) References Cited

U.S. PATENT DOCUMENTS

| | | | |
|---|---|---|---|
| 2012/0044902 A1 | 2/2012 | Sun et al. | |
| 2012/0120905 A1 | 5/2012 | Ko et al. | |
| 2012/0307768 A1* | 12/2012 | Xu | H04L 5/0023 370/329 |
| 2013/0039348 A1* | 2/2013 | Hu | H04B 7/0613 370/335 |
| 2013/0242949 A1* | 9/2013 | Hu | H04W 72/0453 370/335 |
| 2014/0036846 A1* | 2/2014 | Wu | H04W 52/42 370/329 |
| 2014/0078972 A1* | 3/2014 | Sorrentino | H04J 13/0074 370/329 |
| 2014/0211736 A1* | 7/2014 | Noh | H04W 56/0005 370/329 |
| 2014/0301316 A1 | 10/2014 | Sorrentino et al. | |
| 2015/0103801 A1* | 4/2015 | Nam | H04L 5/005 370/330 |
| 2015/0341958 A1* | 11/2015 | Guo | H04L 5/0051 370/329 |

OTHER PUBLICATIONS

International Search Report dated Jul. 25, 2016 in connection with International Patent Application No. PCT/KR2016/004017, 3 pages.
Written Opinion of the International Searching Authority dated Jul. 25, 2016 in connection with International Patent Application No. PCT/KR2016/004017, 6 pages.
Office Action dated Mar. 13, 2020 in connection with Chinese Patent Application No. 201680022050.7, 21 pages.
Office Action dated Nov. 13, 2020 in connection with Chinese Patent Application No. 201680022050.7, 24 pages.
Office Action dated Sep. 14, 2020 in connection with India Patent Application No. 201717033662, 6 pages.
Alcatel-Lucent et al., "Analysis for specification impact of DMRS enhancement", 3GPP TSG RAN WG1 Meeting #80bis, Apr. 20-24, 2015, R1-151775, 3 pages.
CMCC, "Evaluation of MU-MIMO performance and legacy UE pairing", 3GPP TSG RAN WG1 Meeting #80bis, Apr. 20-24, 2015, R1-152037, 5 pages.
Notice of Preliminary Rejection dated Jan. 19, 2021 in connection with Korean Patent Application No. 10-2015-0054654, 11 pages.

* cited by examiner

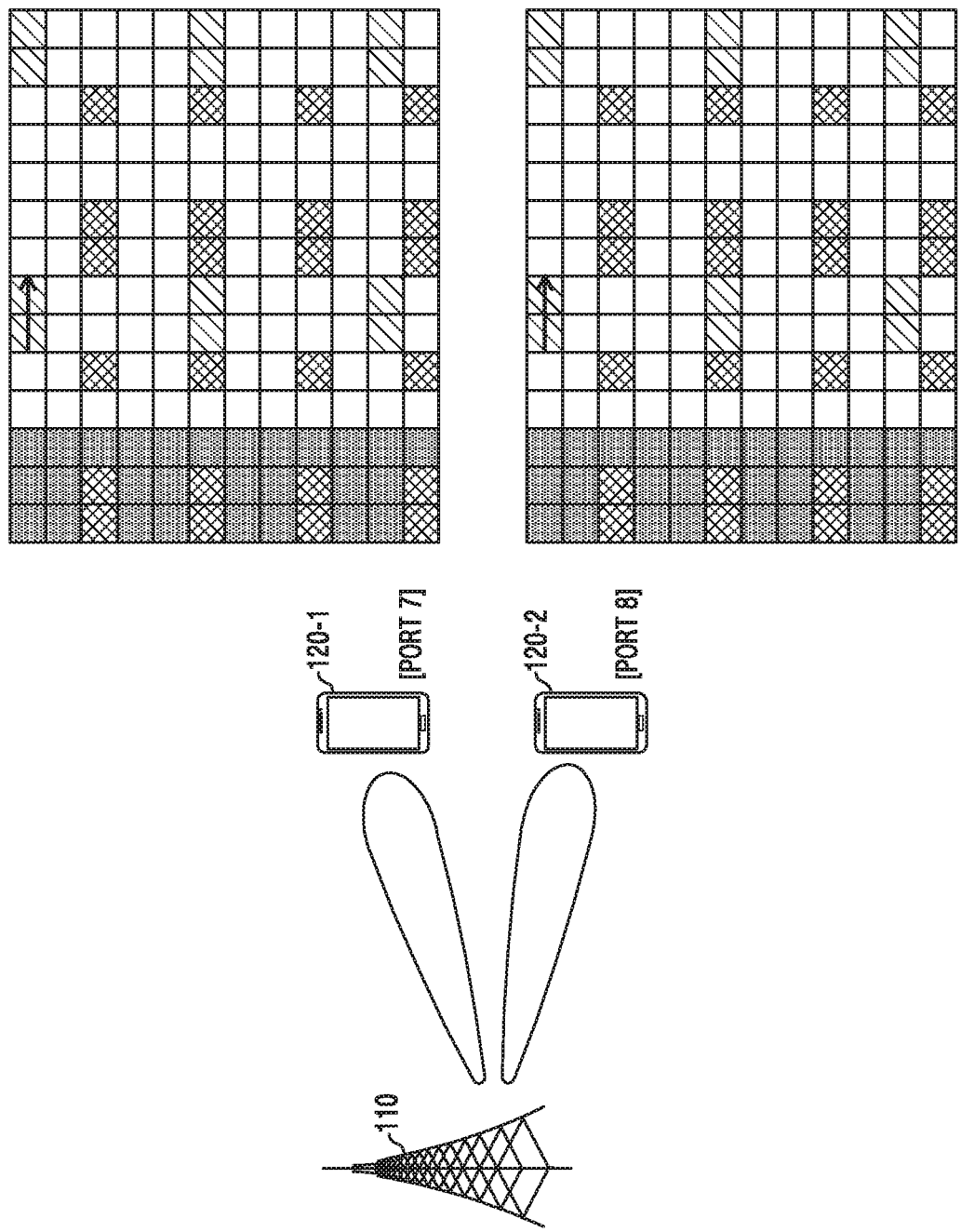

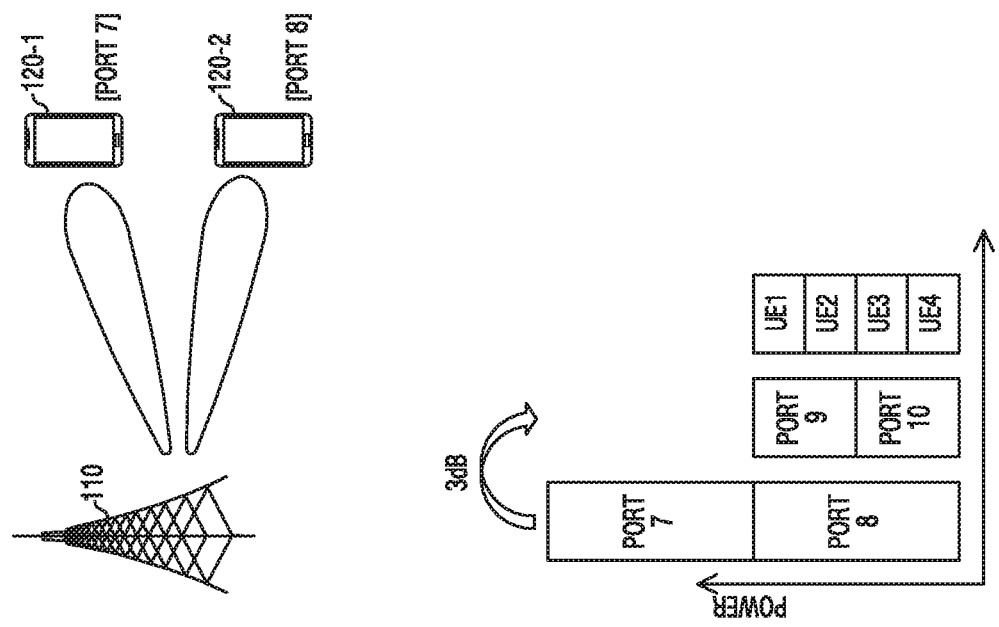
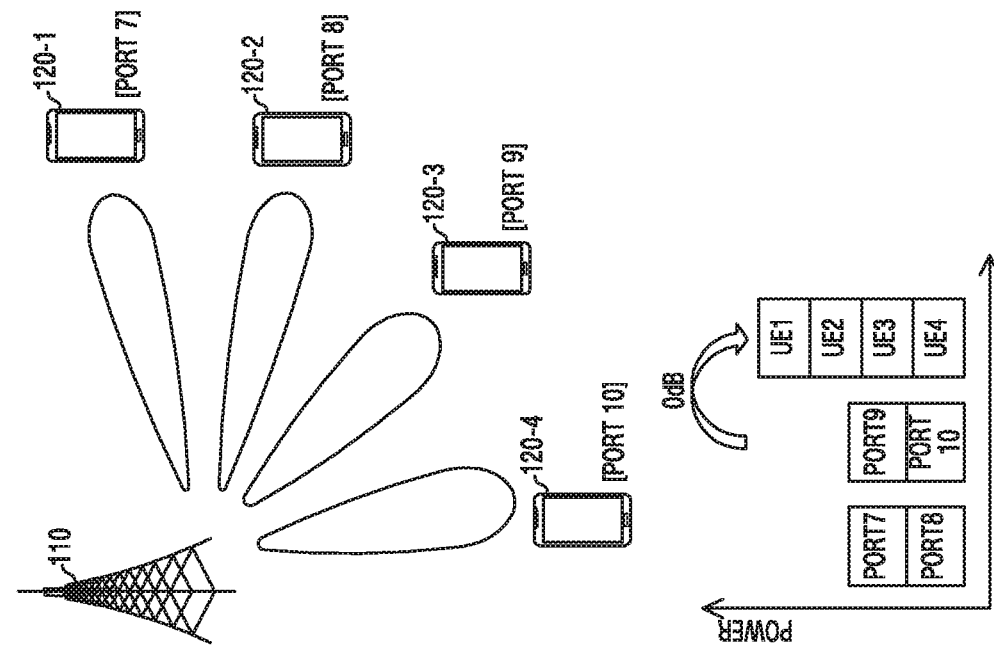

APPARATUS AND METHOD FOR TRANSMITTING REFERENCE SIGNALS IN WIRELESS COMMUNICATION SYSTEM

CROSS-REFERENCE TO RELATED APPLICATIONS

The present application is a continuation of U.S. patent application Ser. No. 15/564,706 filed on Oct. 5, 2017, which is a 371 of International Patent Application No. PCT/KR2016/004017 filed on Apr. 18, 2016, which claims priority to Korean Patent Application No. 10-2015-0054654 filed on Apr. 17, 2015, the disclosures of which are herein incorporated by reference in their entirety.

BACKGROUND

1. Field

The present invention relates to transmission and reception of reference signals in a wireless communication system.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An embodiment of the present invention provides an apparatus and a method for transmitting reference signals in a wireless communication system.

Another embodiment of the present invention provides an apparatus and a method for transmitting reference signals for Multi-User (MU)-Multiple Input and Multiple Output (MIMO) in a wireless communication system.

Yet another embodiment of the invention provides an apparatus and a method for transmitting reference signals for MU-MIMO of a high order in a wireless communication system.

Still another embodiment of the invention provides an apparatus and a method for improving of channel estimation performance in MU-MIMO communication in a wireless communication system.

A further embodiment of the invention provides an apparatus and a method for transmitting control information for reference signals for MU-MIMO communication in a wireless communication system.

A method for operating a terminal in a wireless communication system according to an embodiment of the present invention includes receiving control information for reference signals from a base station, and receiving the reference signals according to the control information, wherein the control information includes information indicating a length of an orthogonal code applied to the reference signals.

A method for operating a terminal in a wireless communication system according to another embodiment of the present invention includes receiving control information according to control information, and performing blind detection for the reference signals, wherein the blind detection is performed by considering different situations for at least one of whether reference signals for another multiplexing group are transmitted and a power boosting value applied to the reference signals.

A method for operating a base station in a wireless communication system according to an embodiment of the present invention includes transmitting control information for reference signals to a terminal, and transmitting the reference signals to the terminal according to the control information, wherein the control information includes information indicating a length of an orthogonal code applied to the reference signals.

An apparatus of a terminal in a wireless communication system according to an embodiment of the present invention includes a receiving unit for receiving control information for reference signals from a base station, and receiving the reference signals according to the control information, wherein the control information includes information indicating a length of an orthogonal code applied to the reference signals.

An apparatus of a terminal in a wireless communication system according to another embodiment of the present invention includes a receiving unit for receiving reference signals according to control information, and a control unit for performing blind detection for the reference signals, wherein the blind detection is performed by considering different situations for at least one of whether reference signals for another multiplexing group are transmitted and a power boosting value applied to the reference signals.

An apparatus of a base station in a wireless communication system according to an embodiment of the present invention includes a transmitting unit for transmitting control information for reference signals to a terminal, and transmitting the reference signals to the terminal according to the control information, wherein the control information includes information indicating a length of an orthogonal code applied to the reference signals.

According to another embodiment of the present invention, the control information can further include at least one of information indicating the number of multiplexed terminals, information indicating whether reference signals for other multiplexing group are transmitted, a power boosting value applied to the reference signals, a reference signal related parameter of a subband unit, and information indicating the number of subbands applying the same parameter.

Reference signals can be transmitted efficiently according to the number of terminals multiplexed through Multi-User (MU)-Multiple Input and Multiple Output (MIMO) in a wireless communication system.

BRIEF DESCRIPTION OF THE DRAWINGS

FIGS. 8A and 8B depict examples of an orthogonal code length based on the number of terminals in a wireless communication system according to an embodiment of the present invention.

FIGS. 24A and 24B depict an example of a fixed power boosting value of reference signals in a wireless communication system according to an embodiment of the present invention.

DETAILED DESCRIPTION

Hereinafter, an operational principle of the present invention is described in detail with reference to the accompanying drawings. In the following explanations, well-known functions or constitutions will not be described in detail if they would unnecessarily obscure the subject matter of the present invention. Also, terminologies to be described below are defined in consideration of functions in the present invention and can vary depending on a user's or an operator's intention or practice. Thus, their definitions should be defined based on all the contents of the specification.

Hereafter, the present invention describes a technique for transmitting and receiving reference signals in a wireless communication system.

Hereafter, terms for indicating signals, terms for indicating network entities, terms for indicating channels, terms for identifying antennas, and terms for indicating control information or parameters in the control information are used to ease the understanding. Accordingly, the present invention is not limited to those terms and can adopt other terms indicating targets having technically equivalent meanings.

Hereafter, the present invention explains a wireless communication system of an Orthogonal Frequency Division Multiplexing (OFDM)/Orthogonal Frequency Division Multiple Access (OFDMA) scheme by way of example. Also, to ease the understanding, terms and names defined in 3rd Generation Partnership Project (3GPP) Long Term Evolution (LTE) standard are used. However, the present invention is not limited to those terms and names, and can be equally applied to a system conforming to other standards.

To increase system capacity of the wireless communication system, techniques for increasing and using antennas in a base station are developing. A system using a large number of antennas can greatly increase the system capacity by facilitating Multi-User (MU) multi-antenna, that is, MU-Multiple Input and Multiple Output (MIMO) transmission through array gain. Hence, various embodiments of the present invention describe a structure and a design of reference signals for the MU-MIMO transmission.

A system such as LTE-Advanced (LTE-A) uses reference signals for channel information estimation of a receiving stage to receive data from a transmitting stage. Thus, a wireless communication system according to an embodiment of the present invention can use the reference signals as shown in FIG. 1.

Figure 1:
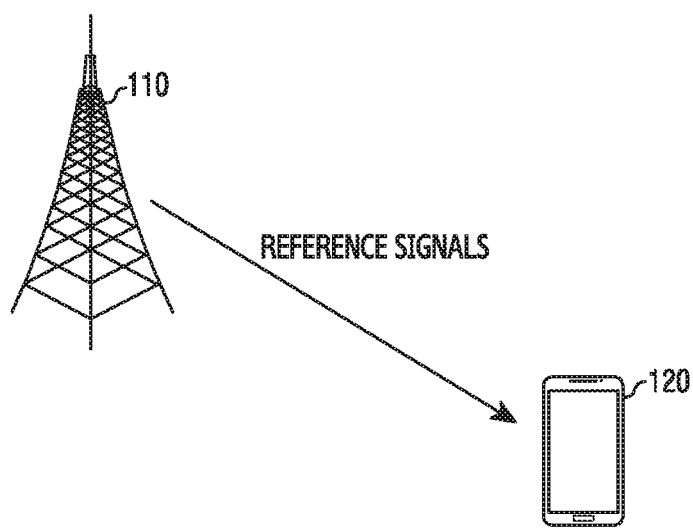
FIG. 1 depicts an example of a base station and a terminal for transmitting reference signals in a wireless communication system according to an embodiment of the present invention.

FIG. 1 depicts an example of a base station and a terminal for transmitting reference signals in a wireless communication system according to an embodiment of the present invention. While only one terminal is shown in FIG. 1, a plurality of terminals can receive reference signals. Referring to FIG. 1, a base station 110 and a terminal 120 can communicate. In so doing, the base station 110 can transmit reference signals to the terminal 120. The reference signal is a signal for estimating channel information, and has a pre-arranged value between the base station 110 and the terminal 120. The reference signal can be referred to as a pilot, a training signal, and so on. The reference signal can be referred to variously according to its use, and the reference signal used in data reception, that is, channel estimation for demodulation and channel decoding of data signals can be referred to as a Demodulation Reference Signal (DM-RS).

In MU-MIMO transmission, even when data resources are transmitted at the same time to enhance a transmission rate, a reference signal resource for the channel estimation is required to be allocated orthogonally for accuracy of the channel estimation. Hence, as the number of terminals serviced in the MU-MIMO or the number of data streams increases, more reference signal resources can be consumed. Accordingly, various embodiments of the present invention provide a reference signal transmission and reception technique for the MU-MIMO of a higher order.

Figure 2:
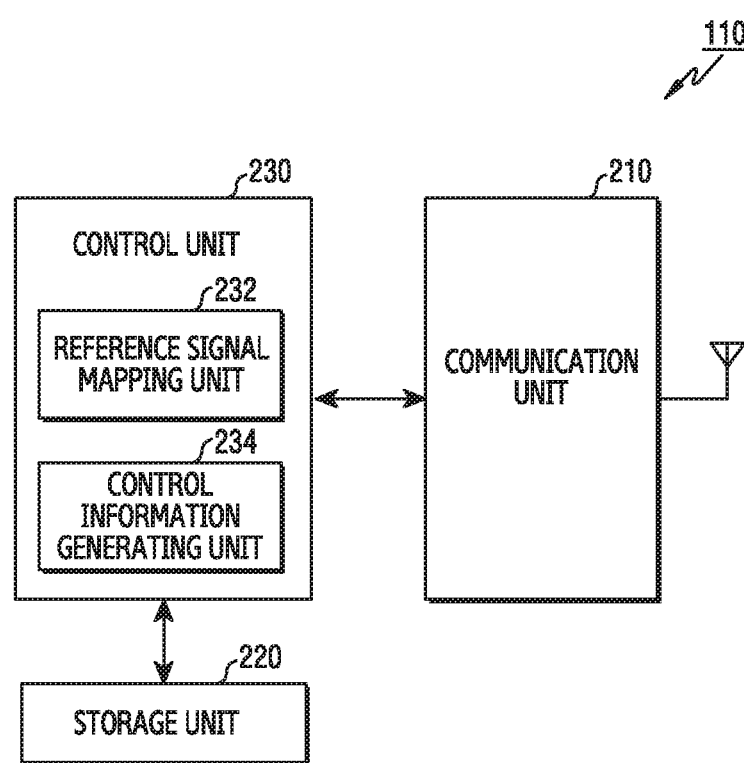
FIG. 2 depicts a block diagram of a base station in a wireless communication system according to an embodiment of the present invention.

FIG. 2 depicts a block diagram of a base station in a wireless communication system according to an embodiment of the present invention. FIG. 2 illustrates a structure of the base station 110.

As shown in FIG. 2, the base station includes a communication unit 210, a storage unit 220, and a control unit 230. Hereinafter, a term such as ' . . . unit', ' . . . part' means a unit for processing at least one function or operation, which can be implemented using hardware, software, or a combination of hardware and software.

The communication unit 210 performs functions for transmitting and receiving signals over a radio channel. For example, the communication unit 210 performs a conversion function between a baseband signal and a bit stream according to a physical layer standard of a system. For example, in data transmission, the communication unit 210 generates complex symbols by encoding and modulating a transmit bit stream. In so doing, the communication unit 210 can map the complex symbols to subcarriers, and generate OFDM symbols through an Inverse Fast Fourier Transform (IFFT) operation. Also, in data reception, the communication unit 210 restores a receive bit stream by demodulating and decoding a baseband signal. Also, the communication unit 210 up-converts the baseband signal to a Radio Frequency (RF) band signal, transmits it via an antenna, and down-converts an RF band signal received via the antenna to a baseband signal. For example, the communication unit 210 can include a transmit filter, a receive filter, an amplifier, a mixer, an oscillator, a Digital to Analog Convertor (DAC), an Analog to Digital Convertor (ADC), and the like.

Also, the communication unit 210 can include a plurality of RF chains. Further, the communication unit 210 can conduct beamforming. For the beamforming, the communication unit 210 can adjust a phase and a magnitude of signals transmitted and received over a plurality of antennas or antenna elements. Also, the communication unit 210 can precode a plurality of data streams transmitted. Hence, the base station can perform the MU-MIMO communication. The communication unit 210 transmits and receives the signals as mentioned above. Accordingly, the communication unit 210 can be referred to as a transmitting unit, a receiving unit, or a transceiving unit.

The storage unit 220 stores a basic program for the operations of the base station, an application program, and data such as setting information. Also, the storage unit 220 provides the stored data according to a request of the control unit 230.

The control unit 230 controls general operations of the base station. For example, the control unit 220 transmits/receives signals through the communication unit 210. Also, the control unit 230 records and reads data in and from the storage unit 220. For doing so, the control unit 230 can include at least one processor. According to an embodiment of the present invention, the control unit 230 can include a reference signal mapping unit 232 for generating and mapping reference signals. Also, the control unit 230 can include a control information generating unit 234 for generating control information for the reference signals. For example, the control unit 230 can control the base station to transmit the control information and the reference signals, to be explained.

Figure 3:
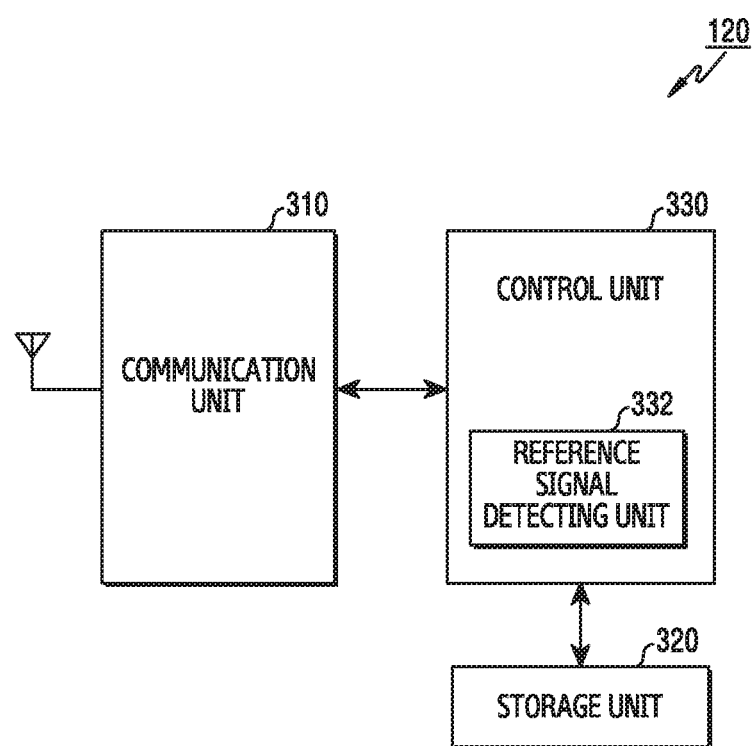
FIG. 3 depicts a block diagram of a terminal in a wireless communication system according to an embodiment of the present invention.

FIG. 3 depicts a block diagram of a terminal in a wireless communication system according to an embodiment of the present invention. FIG. 3 illustrates a structure of the terminal 120.

As shown in FIG. 3, the terminal includes a communication unit 310, a storage unit 320, and a control unit 330. Hereinafter, a term such as '. . . unit', '. . . part' means a unit for processing at least one function or operation, which can be implemented using hardware, software, or a combination of hardware and software.

The communication unit 310 performs functions for transmitting and receiving signals over a radio channel. For example, the communication unit 310 performs a conversion function between a baseband signal and a bit stream according to a physical layer standard of a system. For example, in data transmission, the communication unit 310 generates complex symbols by encoding and modulating a transmit bit stream. Also, in data reception, the communication unit 310 restores a receive bit stream by demodulating and decoding a baseband signal. In so doing, the communication unit 310 can restore the complex symbols per subcarrier by splitting the received signal on the OFDM symbol unit and performing an FFT operation on the OFDM symbol. Also, the communication unit 310 up-converts the baseband signal to an RF band signal, transmits it via an antenna, and down-converts an RF band signal received via the antenna to a baseband signal. For example, the communication unit 310 can include a transmit filter, a receive filter, an amplifier, a mixer, an oscillator, a DAC, an ADC, and the like.

Also, the communication unit 310 can include a plurality of RF chains. Further, the communication unit 310 can conduct beamforming. For the beamforming, the communication unit 310 can adjust a phase and a magnitude of signals transmitted and received over a plurality of antennas or antenna elements. The communication unit 310 transmits and receives the signals as mentioned above. Accordingly, the communication unit 310 can be referred to as a transmitting unit, a receiving unit, or a transceiving unit.

The storage unit 320 stores a basic program for the operations of the terminal, an application program, and data such as setting information. Also, the storage unit 320 provides the stored data according to a request of the control unit 330.

The control unit 330 controls general operations of the terminal. For example, the control unit 330 transmits/receives signals through the communication unit 310. Also, the control unit 330 records and reads data in and from the storage unit 320. For doing so, the control unit 330 can include at least one processor. For example, the control unit 330 can include a Communication Processor (CP) for controlling the communication and an Application Processor (AP) for controlling a higher layer such as application program. According to an embodiment of the present invention, the control unit 330 can include a reference signal detecting unit 332 for interpreting the control information for the reference signals received from the base station and analyzing the reference signals based on the control information. For example, the control unit 330 can control the terminal to receive the control information and the reference signals, to be explained.

Figure 4:
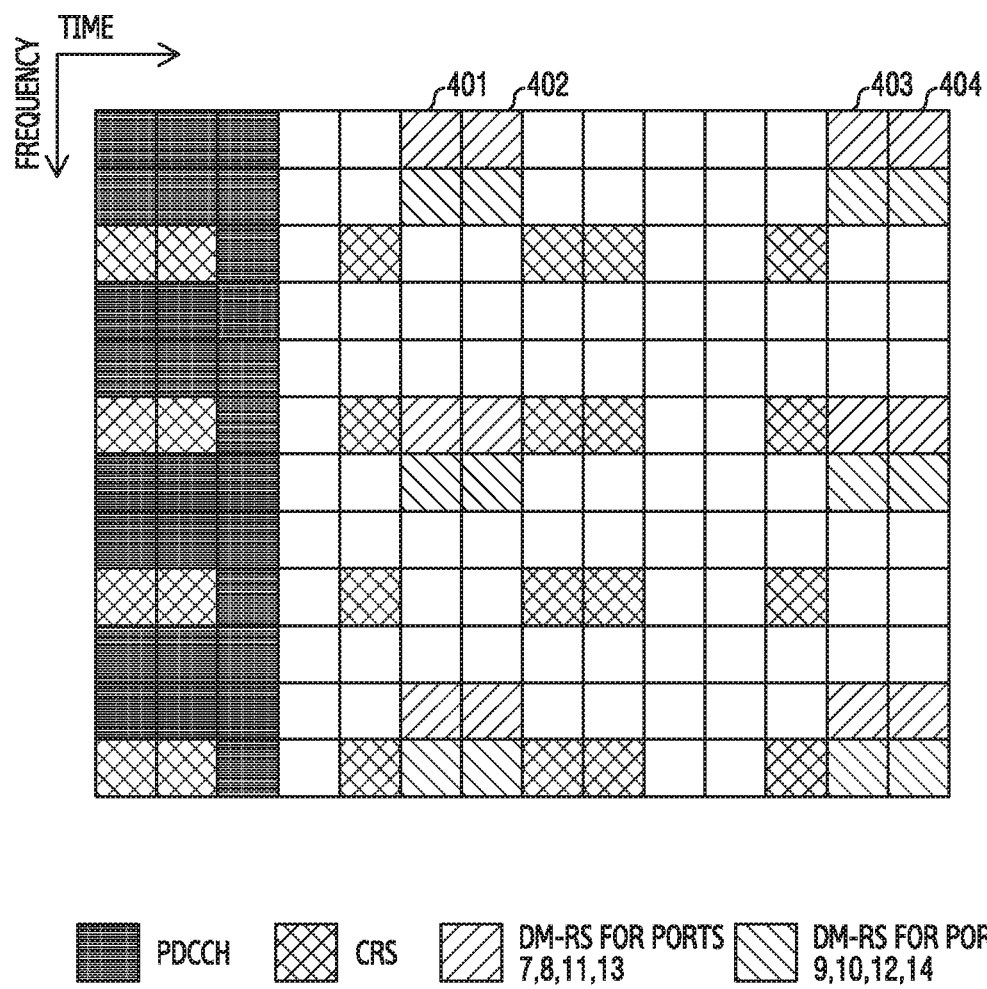
FIG. 4 depicts a mapping example of reference signals in a wireless communication system according to an embodiment of the present invention.

FIG. 4 depicts a mapping example of reference signals in a wireless communication system according to an embodiment of the present invention. FIG. 4 illustrates the mapping of reference signals for eight antenna ports. The antenna ports are logical antennas used for the base station to transmit a signal, and can be greater than physical antennas of the base station in number.

Referring to FIG. 4, some of Resource Elements (REs) arranged on a frequency axis and a time axis can be allocated as a control channel (e.g., physical downlink common control channel (PDCCH)), some can be used to transmit a Common Reference Signal (CRS), and some can be used to transmit reference signals. The reference signal is used to estimate channel information to detect data transmitted through the corresponding antenna port. Herein, the detection embraces demodulating and channel decoding. Accordingly, the reference signal can be precoded with the data signal and then transmitted.

Reference signals for antenna ports 7, 8, 11, and 13 are transmitted on the same REs. Also, reference signals for antenna ports 9, 10, 12, and 14 are transmitted on the same REs. That is, the reference signals for the antenna ports 7, 8, 11, and 13 and the reference signals for the antenna ports 9, 10, 12, and 14 are transmitted over different resources. The reference signals for the antenna ports 7, 8, 11, and 13 and the reference signals for the antenna ports 9, 10, 12, and 14 transmitted over the same resources can be distinguished based on Code Division Multiplexing (CDM). Thus, the antenna ports 7, 8, 11, and 13 transmitted over the same resources are classified to a CDM group #1, and the antenna ports 9, 10, 12, and 14 transmitted over the different resources are classified to a CDM group #2. The CDM group #1 and the CDM group #2 are sets of the antenna ports, the reference signals, or the terminals multiplexed in the same resources. To ease the understanding, the CDM group can be referred to as a group, a multiplexing group, and so on.

According to the CDM, reference signals for antenna ports in one CDM group are multiplied by an Orthogonal Covering Code (OCC). The OCC can be allocated to each antenna port as shown in Table 1.

TABLE 1

| Port number | OCC sequence |
| --- | --- |
| 7 | [+1 +1 +1 +1] |
| 8 | [+1 −1 +1 −1] |
| 11 | [+1 +1 −1 −1] |
| 13 | [+1 −1 −1 +1] |
| 9 | [+1 +1 +1 +1] |
| 10 | [+1 −1 +1 −1] |
| 12 | [−1 −1 +1 +1] |
| 14 | [−1 +1 +1 −1] |

In Table 1, while the same OCC sequences are applied to the antenna ports 7 and 9, the antenna ports 8 and 10, the antenna ports 11 and 12, and the antenna ports 13 and 14, they can be distinguished because they use different REs, that is, their CDM groups are different. The reference signals for the antenna ports in the same CDM group can be distinguished by the OCC. For example, the antenna port 8 uses the OCC sequence [+1 −1 +1 −1]. Accordingly, the reference signal for the antenna port 8 is transmitted over REs 401, 402, 403, and 404, the reference signal transmitted over the RE 401 is multiplied by +1 and then transmitted, the reference signal transmitted over the RE 402 is multiplied by −1 and then transmitted, the reference signal transmitted over the RE 403 is multiplied by +1 and then transmitted, and the reference signal transmitted over the RE 404 is multiplied by +1 and then transmitted.

Hence, by combining the number corresponding to the OCC length, that is, the reference signals received over the four REs, the terminal can identify one reference signal value corresponding to its allocated antenna port. In so doing, the terminal can receive control information as shown in Table 2 and obtain information about its allocated reference signal from the control information.

TABLE 2

| One codeword | | Two codewords | |
|---|---|---|---|
| value | message | value | message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | — | 7 | 8 layers, ports 7-14 |

In Table 2, the codeword indicates a coding block, the number of layers indicates the number of ranks, and $n_{SCID}$ denotes a scrambling sequence index. That is, the case where the 2-layer is used in one codeword indicates that one coding blocking is divided into two transmission units and then transmitted through two pots.

Various embodiments of the present invention can be divided into a case where four reference signal ports are used for one CDM group and a case where four reference signal ports are used for two CDM groups. Additionally, the present invention provides various embodiments for transmitting control information of reference signals per subband.

In brief, when the four reference signal ports are used for the one CDM group, the OCC can be applied differently according to the number of the multiplexed terminals. When the four reference signal ports are used for the two CDM groups, a reference signal power and data channel muting can be applied differently according to the number of the multiplexed terminals. When the control information is configured per subband, a new Resource Block (RB) size can be defined to transmit reference signal port information. Alternatively, part of the reference signal port information can be shared for WideBand (WB), and the rest can be distinguished per subband (SB).

Hereafter, various embodiments for various reference signal configurations and control information configurations based on the number of CDM groups are described. In the following, to ease the understanding, the present invention illustrates that the antenna ports 7/8/11/13 are used for one CDM group. Also, the present invention illustrates that the antenna ports 7/8/9/10 are used for two CDM groups. However, the antenna port number can vary according to a specific embodiment.

Figure 5:
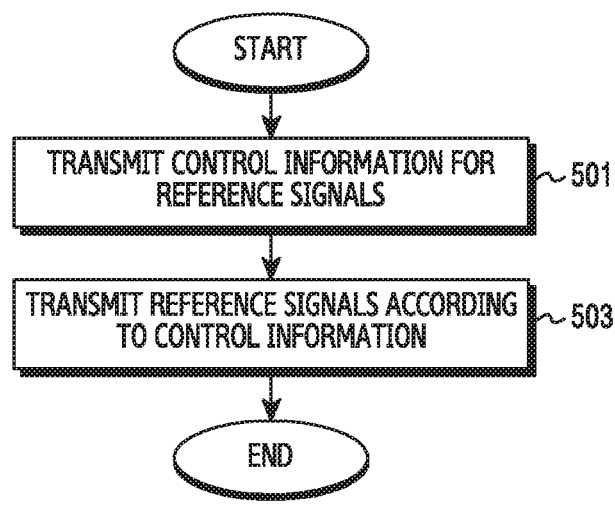
FIG. 5 depicts an operating procedure of a base station in a wireless communication system according to an embodiment of the present invention.

FIG. 5 depicts an operating procedure of a base station in a wireless communication system according to an embodiment of the present invention. FIG. 5 illustrates an operating method of the base station 110.

Referring to FIG. 5, the base station transmits control information for reference signals in step 501. The control information includes control information required for a terminal to detect the reference signals. For example, the control information can include information indicating an antenna port allocated to the terminal, and information indicating an orthogonal code (e.g., OCC). In particular, according to an embodiment of the present invention, the control information can include at least one of information indicating an orthogonal code length, information indicating the number of multiplexed terminals, information indicating whether reference signals for another group (e.g., CDM group) are transmitted, information indicating a power boosting value applied to the reference signals, a reference signal related parameter of a subband unit, and information indicating the number of subbands to which the same control information is applied. Alternatively, according to an embodiment of the present invention, the control information can be divided into a first portion and a second portion, the first portion can be transmitted as information corresponding to each of the plurality of subbands, and the second portion can be transmitted as information corresponding to each of the plurality of subbands.

Next, the base station transmits reference signals according to the control information in step 503. In so doing, the base station can transmit the reference signals using orthogonal codes of the length indicated by the control information. Alternatively, the base station can mute a data resource for a second group with respect to REs carrying reference signals for a first group. Alternatively, the base station can boost the reference signals according to the value indicated by the control information.

Figure 6:
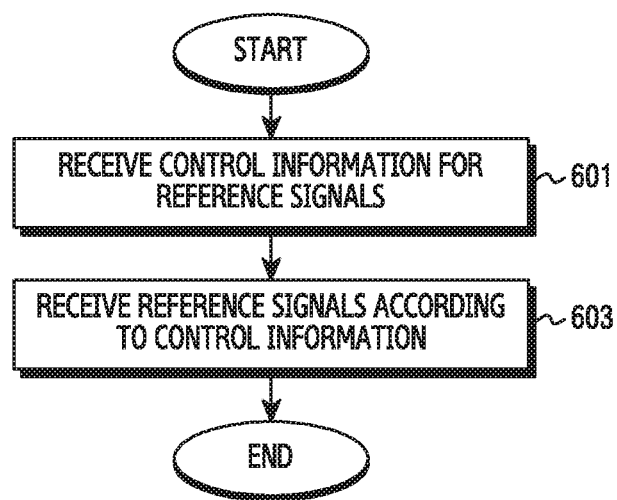
FIG. 6 depicts an operating procedure of a terminal in a wireless communication system according to an embodiment of the present invention.

FIG. 6 depicts an operation procedure of a terminal in a wireless communication system according to an embodiment of the present invention. FIG. 6 illustrates an operating method of the terminal 120.

Referring to FIG. 6, the terminal receives control information for reference signals in step 601. The control information includes control information required for the terminal to detect the reference signals. For example, the control information can include information indicating an antenna port allocated to the terminal, and information indicating an orthogonal code (e.g., OCC). In particular, according to an embodiment of the present invention, the control information can include at least one of information indicating the orthogonal code length, information indicating the number of multiplexed terminals, information indicating whether reference signals for another group (e.g., CDM group) are transmitted, information indicating a power boosting value applied to the reference signals, a reference signal related parameter on the subband unit, and information indicating the number of subbands to which the same control information is applied to. Alternatively, according to an embodiment of the present invention, the control information can be divided into a first portion and a second portion, the first portion can be received as information corresponding to each of the plurality of subbands, and the second portion can be received as information corresponding to each of the plurality of subbands.

Next, the terminal receives reference signals according to the control information in step 603. In so doing, the terminal can detect the reference signals for the antenna ports allocated to the terminal using orthogonal codes of the length indicated by the control information. Alternatively, the terminal can interpret that REs carrying reference signals for another group are empty or carry data signals, or perform blind detection. Alternatively, the terminal can detect the reference signals by considering a power boosting value indicated by the control information. Alternatively, the terminal can obtain the control information for the terminal by combining the first portion applied to the plurality of the subbands and the second portion applied to each subband.

Embodiments when four reference signal ports are used for one CDM group are as follows. To describe the case where the four reference signal ports are used for the one CDM group, a situation of FIG. 7 is illustrated.

Figure 7:
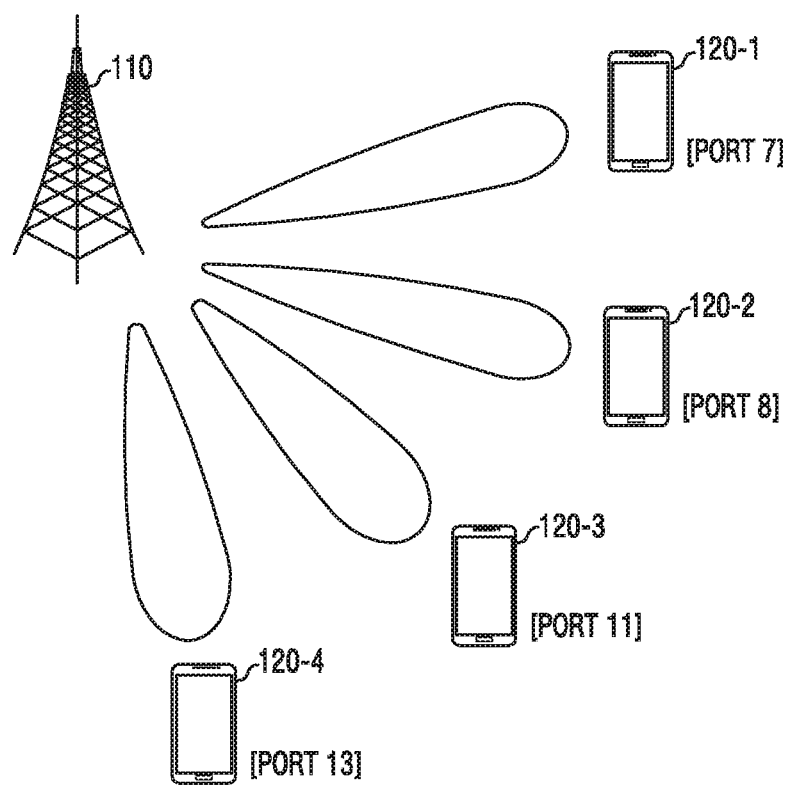
FIG. 7 depicts an example of a situation where four antenna ports are used for one Code Division Multiplexing (CDM) group in a wireless communication system according to an embodiment of the present invention.

FIG. 7 depicts an example of a situation where four antennas are used for one CDM group in a wireless communication system according to an embodiment of the present invention. Referring to FIG. 7, a base station 110 communicates with terminals 120-1 through 120-4. In so doing, the terminal 120-1 uses an antenna port 7, the terminal 120-2 uses an antenna port 8, the terminal 120-3 uses an antenna port 11, and the terminal 120-4 uses an antenna port 13.

The base station 110 transmits control information for reference signals, that is, control information to the terminals 120-1 through 120-4. The control information indicates the number of layers allocated to each terminal, that is, the number of streams or ports, and the allocated port number. For example, the control information can be configured as shown in Table 3.

TABLE 3

| value | note |
|---|---|
| 0 | 1 layer, port 7 |
| 1 | 1 layer, port 8 |
| 2 | 1 layer, port 11 |
| 3 | 1 layer, port 13 |

In Table 3, 'value' is the value transmitted as the control information, and 'contents' is a corresponding parameter.

The terminals 120-1 through 120-4 receiving the control information apply the orthogonal code corresponding to the allocated antenna port, that is, the OCC. For example, correspondence between the antenna port and the orthogonal code can be defined as shown in Table 4.

TABLE 4

| Port number | Orthogonal code |
|---|---|
| 7 | [+1 +1 +1 +1] |
| 8 | [+1 −1 +1 −1] |
| 11 | [+1 +1 −1 −1] |
| 13 | [+1 −1 −1 +1] |

Referring to the orthogonal codes in Table 4, it is noted that just some of the orthogonal codes have orthogonality. In particular, the orthogonal codes allocated to the port 7 and the port 8 have the orthogonality merely with two values as shown in Table 5.

TABLE 5

| Port number | Orthogonal code |
|---|---|
| 7 | [+1 +1 +1 +1] → [+1 +1] |
| 8 | [+1 −1 +1 −1] → [+1 −1] |

The length of the orthogonal code for the CDM is greatly related to channel estimation performance. That is, as the length of the orthogonal code gets short, the number of resources (e.g., REs) to use to maintain the orthogonality reduces. The number of the resources reduces, more valid reference signals can be provided and thus the channel estimation performance can be enhanced. Hence, when only the port 7 and the port 8 are used, it is preferred to enhance the channel estimation performance by applying orthogonal codes of the length 2. Thus, a system according to an embodiment of the present invention can use orthogonal codes of different lengths according to the number of the multiplexed terminals in the same resource as shown in FIG. 8A and FIG. 8B.

Figure 8B:
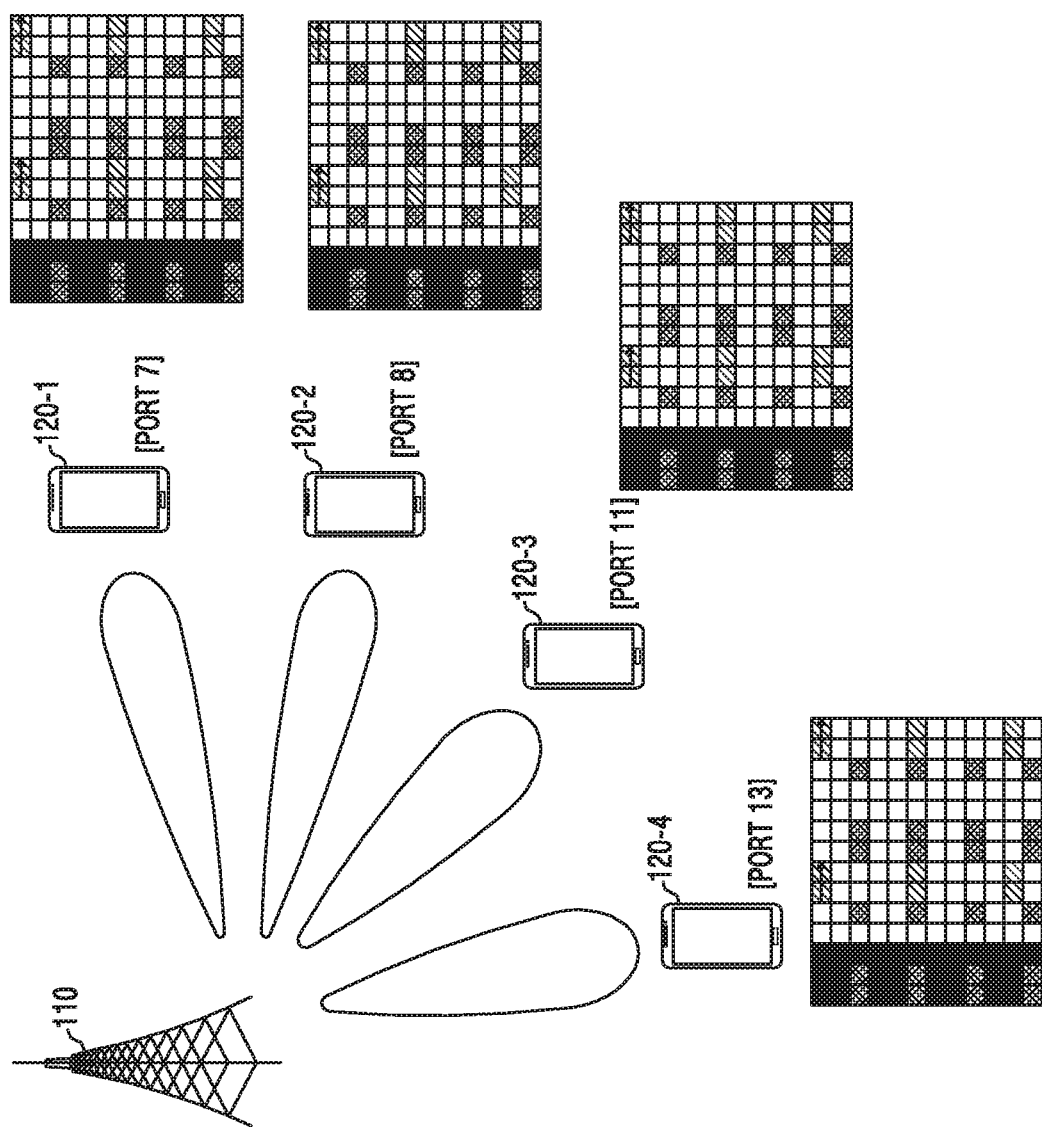

FIGS. 8A and 8B depict examples of an orthogonal code length based on the number of terminals in a wireless communication system according to an embodiment of the present invention. In FIGS. 8A and 8B, an arrow indicates a range of REs applying one orthogonal code. FIG. 8A shows a case where two terminals are multiplexed in the same resource, that is, two terminals are included in one CDM group. In this case, since reference signals for two ports (e.g., ports 7 and 8) can have orthogonality according to the orthogonal codes of the length 2, the orthogonal codes of the length 2 can be used. FIG. 8B shows a case where four terminals are multiplexed in the same resource, that is, four terminals are included in one CDM group. In this case, since reference signals for four ports (e.g., ports 7, 8, 11, and 13) cannot have the orthogonality according to the orthogonal codes of the length 2, the orthogonal codes of length 4 are used.

As stated above, the length of the orthogonal code can vary according to the number of the terminals. In this case, information about the orthogonal code length to be applied by the terminals needs to be transmitted to the terminals. More specifically, the base station needs to inform the terminals of whether to apply the orthogonal code length 2 or the orthogonal code length 4. For doing so, the present invention suggests a reference signal port using method to transmit the orthogonal code length in addition to the existing reference signal port information. Herein, since the length depends on the number of the reference signals multiplexed in the same resource, the reference signal or terminal number information can replace the orthogonal code length.

According to an embodiment of the present invention, the orthogonal code length can be added to the control information of the reference signals. However, since the situation where the orthogonal codes of the length 2 are limited, the control information can be configured more efficiently. When one CDM group uses only two of the four ports, the orthogonal code length 2 can be applied. Hence, the present invention suggests a control information structure which can change the orthogonal code length only for particular ports. For example, the control information can be configured as shown in Table 6.

TABLE 6

| Value | Port | Length of orthogonal code |
|---|---|---|
| 0 | port 7 | 2 |
| 1 | port 8 | 2 |
| 2 | port 7 | 4 |
| 3 | port 8 | 4 |
| 4 | port 11 | 4 |
| 5 | port 13 | 4 |

In Table 6, 'value' is the value transmitted as the control information, and 'port' and 'orthogonal code length' are corresponding parameters. As shown in Table 6, two orthogonal code lengths (e.g., 2 or 4) can be selected only for the port 7 and the port 8. This is because the use of the ports 11 and 13 means that three or more terminals are multiplexed.

The information indicating the port and the orthogonal code length representable as shown in Table 6 can be delivered together with other information. For example, the control information can further indicate the number of layers, a scrambling sequence index, and the like. In this case, the control information according to an embodiment can be configured by further adding the orthogonal cod length to the control information constructed as shown in Table 1.

Figure 9:
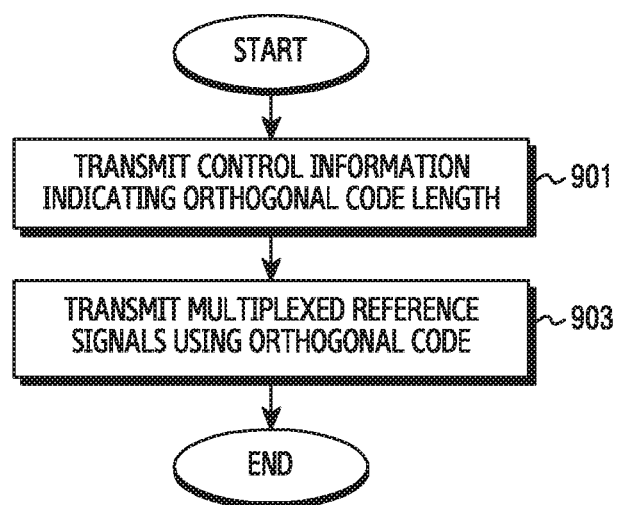
FIG. 9 depicts a reference signal transmitting procedure based on control information notifying an orthogonal code length in a wireless communication system according to an embodiment of the present invention.

FIG. 9 depicts a reference signal transmitting procedure based on control information notifying an orthogonal code length in a wireless communication system according to an embodiment of the present invention. FIG. 9 illustrates an operating method of the base station 110.

Referring to FIG. 9, the base station transmits control information indicating an orthogonal code length in step 901. Herein, the orthogonal code length can vary according to the number of terminals multiplexed in the same resource, that is, participating in MU-MIMO transmission. Hence, the base station determines the orthogonal code length based on the number of the terminals participating in the MU-MIMO transmission, and transmits the control information indicating the orthogonal code length. For example, the control information can include information explicitly indicating the orthogonal code length, or information notifying the number of the terminals participating in the MU-MIMO transmission.

Next, the base station transmits reference signals multiplexed using the orthogonal codes in step 903. That is, the base station transmits the reference signals using the orthogonal codes having the orthogonal code length indicated by the control information. More specifically, the base station can generate the reference signals for a plurality of terminals by multiplying the orthogonal codes to a set of reference signals, and transmit the reference signals over the same resource.

Figure 10:
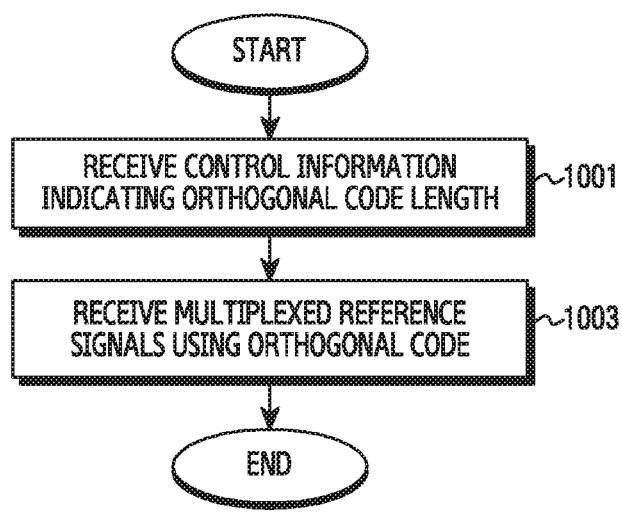
FIG. 10 depicts a reference signal receiving procedure based on control information notifying an orthogonal code length in a wireless communication system according to an embodiment of the present invention.

FIG. 10 depicts a reference signal receiving procedure based on control information notifying an orthogonal code length in a wireless communication system according to an embodiment of the present invention. FIG. 10 illustrates an operating method of the terminal 120.

Referring to FIG. 10, the terminal receives control information indicating an orthogonal code length in step 1001. Herein, the orthogonal code length can vary according to the number of terminals multiplexed in the same resource, that is, participating in MU-MIMO transmission. For example, the control information can include information explicitly indicating the orthogonal code length, or information notifying the number of the terminals participating in the MU-MIMO transmission.

Next, the terminal receives reference signals multiplexed using the orthogonal codes in step 1003. Hence, the terminal can obtain channel information by multiplying the orthogonal code corresponding to a reference signal port allocated to it, and the received reference signals. In so doing, the terminal multiplies the orthogonal code of the length indicated by the control information.

When the orthogonal code length is dynamically changed as shown in the embodiment of FIG. 8A and FIG. 8B, the channel estimation performance can be enhanced. However, overhead of the control information increases. Hence, according to another embodiment of the present invention, orthogonal codes of the same length can be used all the time as shown in FIG. 11A and FIG. 11B.

Figure 11A:
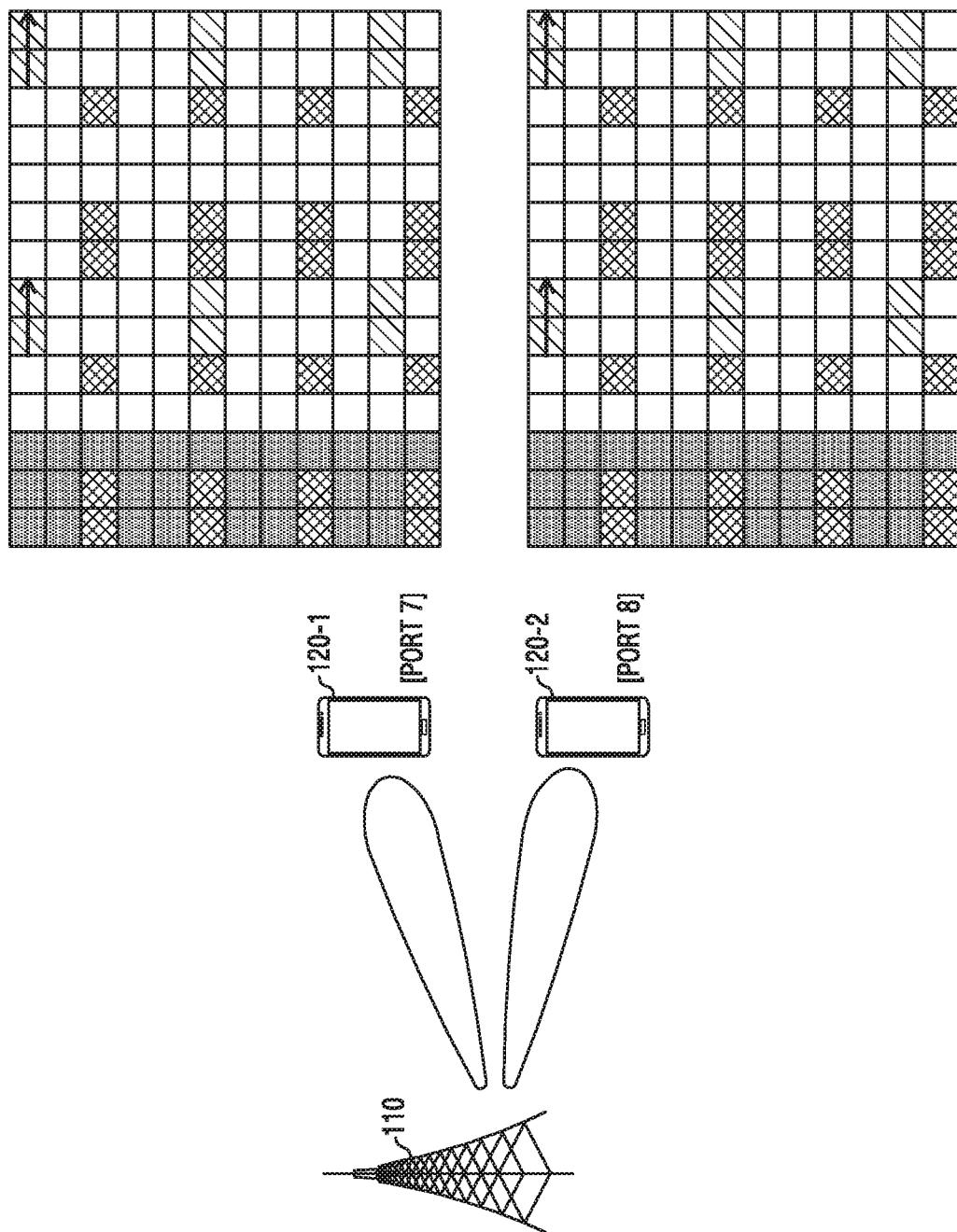
FIGS. 11A and 11B depict another example of an orthogonal code length based on the number of terminals in a wireless communication system according to an embodiment of the present invention.
Figure 11B:
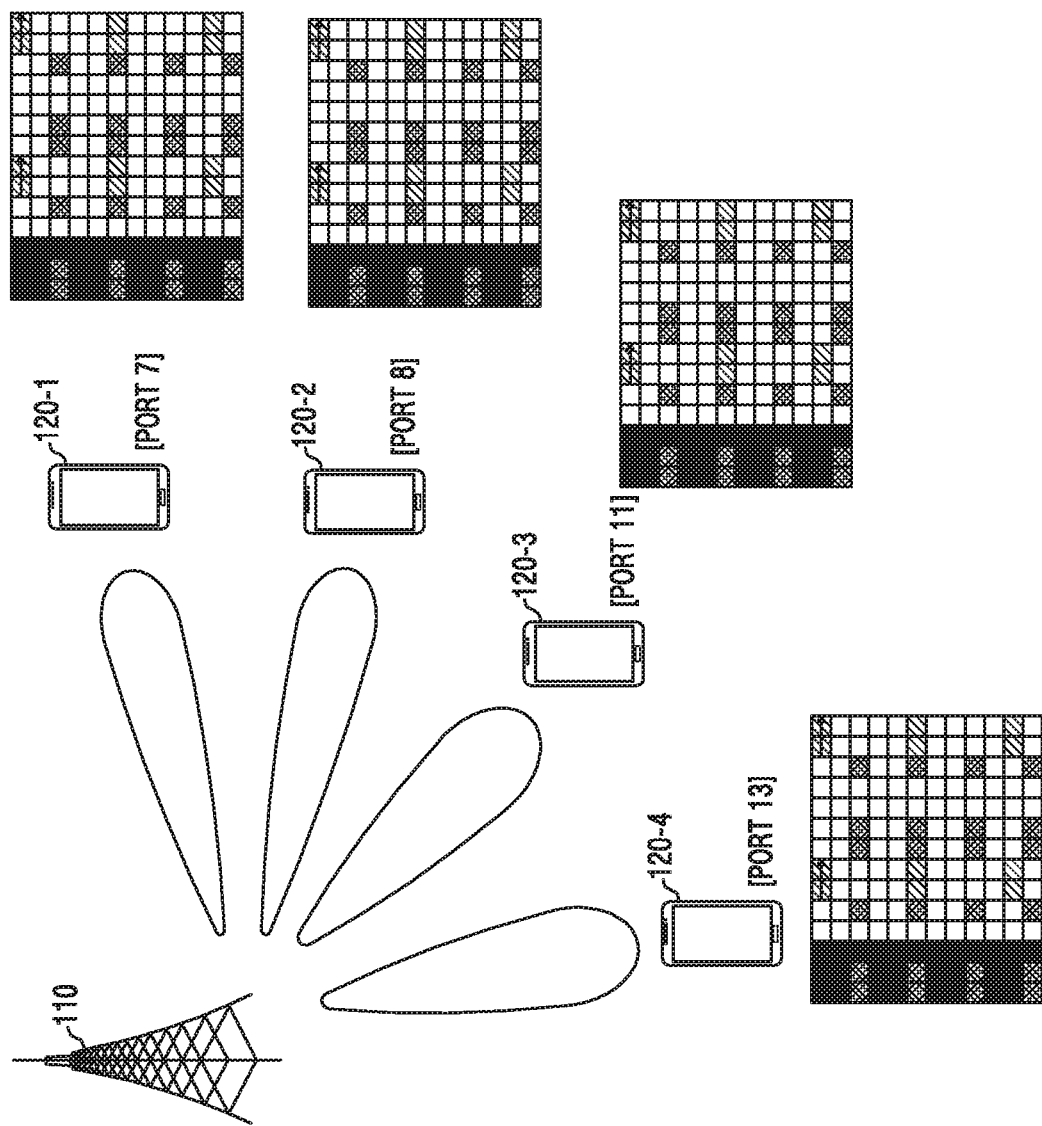

FIGS. 11A and 11B depict another example of an orthogonal code length based on the number of terminals in a wireless communication system according to an embodiment of the present invention. In FIGS. 11A and 11B, an arrow indicates a range of REs applying one orthogonal code. FIG. 11A shows a case where two terminals are multiplexed in the same resource, that is, two terminals are included in one CDM group. Referring to FIGS. 11A and 11B, unlike the embodiment of the FIGS. 8A and 8B, orthogonal codes of length 4 are used regardless of the number of the terminals. Accordingly, a process for notifying the orthogonal code length is not required, and overhead of control information is relatively less.

As stated above, by using the orthogonal codes of the length 4 in one CDM group, MU-MIMO transmission to up to 4 terminals can be performed. In so doing, when one legacy terminal is included in the four terminals, available orthogonal codes can be limited. Herein, the legacy terminal indicates a terminal not capable of interpreting the orthogonal code of the length 4. When the legacy terminal is multiplexed together, orthogonal code allocation can be limited as shown in FIG. 12.

Figure 12:
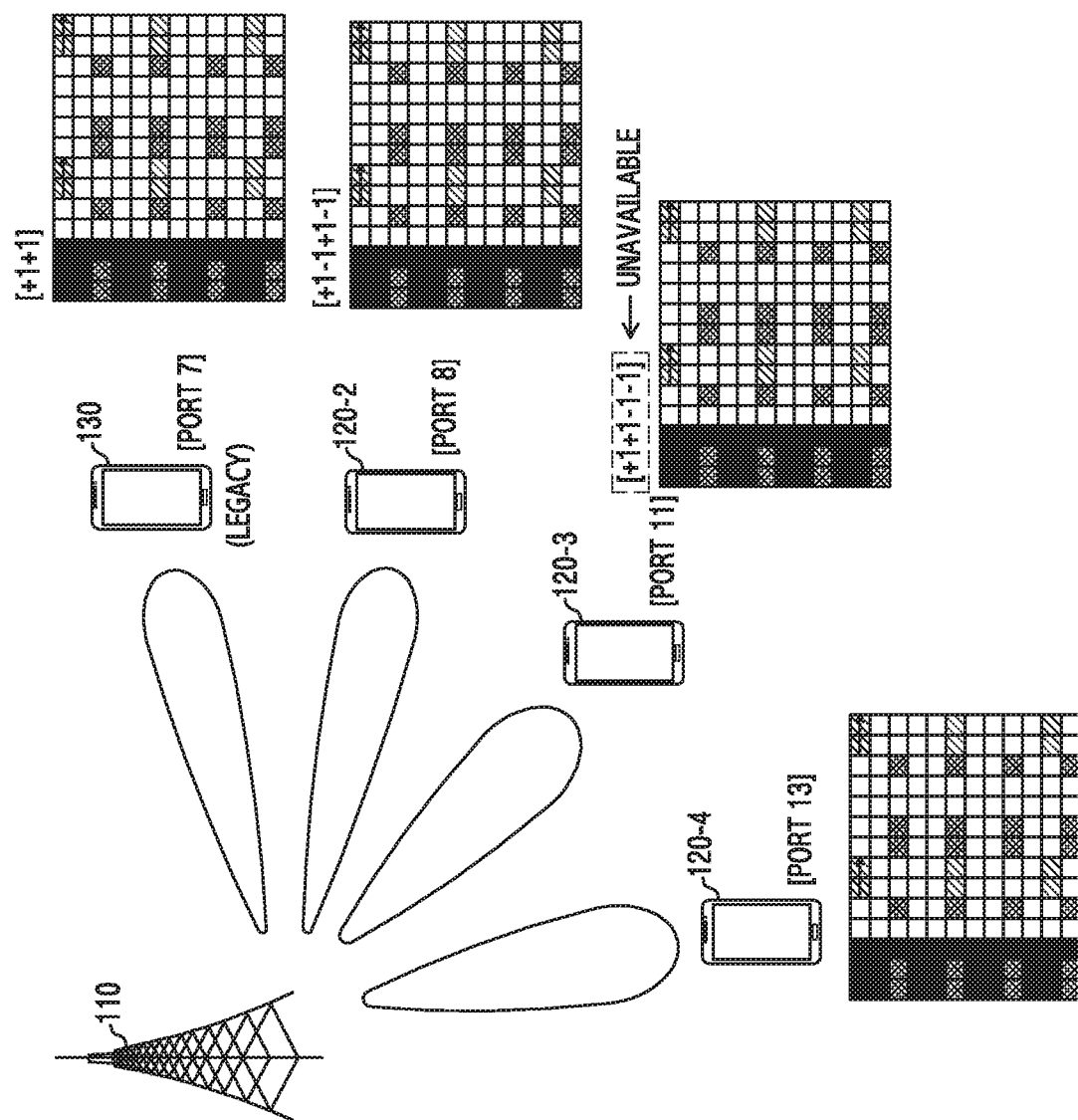
FIG. 12 depicts a scheduling example with a legacy terminal in a wireless communication system according to an embodiment of the present invention.

FIG. 12 depicts a scheduling example with a legacy terminal in a wireless communication system according to an embodiment of the present invention. FIG. 12 shows a case where a legacy terminal 130 is included. Referring to FIG. 12, an antenna port 7 is allocated to the legacy terminal 130. In so doing, the legacy terminal 130, which cannot interpret an orthogonal code of length 4, uses an orthogonal code [+1 +1] of length 2. When the orthogonal code allocated to the terminal 130 is extended to length 4, the orthogonal code becomes [+1 +1 +1 +1]. Accordingly, other available orthogonal codes of the length 4 are [+1 −1 +1 −1], [+1 +1 −1 −1], and [+1 −1 −1 +1]. However, since the legacy terminal 130 interprets the orthogonal code length as 2, the orthogonal code without orthogonality in the range of the length 2 cannot be used together. That is, [+1 +1 −1 −1] cannot be used. In other words, a base station 110 cannot allocate an antenna port 11 using the orthogonal code [+1 +1 −1 −1]. Thus, for MU-MIMO transmission to terminals including the legacy terminal 130, the base station allocates only the other orthogonal codes excluding the orthogonal code (e.g., [+1 +1]) allocated to the legacy terminal 130 and the orthogonal code (e.g., [+1 +1 −1 −1]) having no orthogonality in the range of the length 2. As a result, in the MU-MIMO transmission to the terminals including the legacy terminal 130, the available orthogonal codes are limited and accordingly the number of the terminals allowing the MU-MIMO transmission reduces.

As stated above, the legacy terminal 130 cannot interpret the orthogonal code of the length 4. Further, the legacy terminal 130 also cannot interpret the control information indicating the orthogonal code length as shown in Table 6. Hence, for the legacy terminal 130, the base station 110 can transmit the control information (e.g., Table 2) not indicating the orthogonal code length. In this case, since the interpretation of the control information varies according to the value contained in the control information, it is preferred to negotiate in advance about of which configuration the control information is used. Thus, through signaling with a higher layer, the base station can notify of whether the control information including the orthogonal code length information is transmitted or the control information not including the orthogonal code length information is transmitted.

Embodiments for a case where four reference signal ports are used for two CDM groups are as below. To explain the case where the four reference signal ports are used for the two CDM groups, a situation of FIG. 13 is illustrated.

Figure 13:
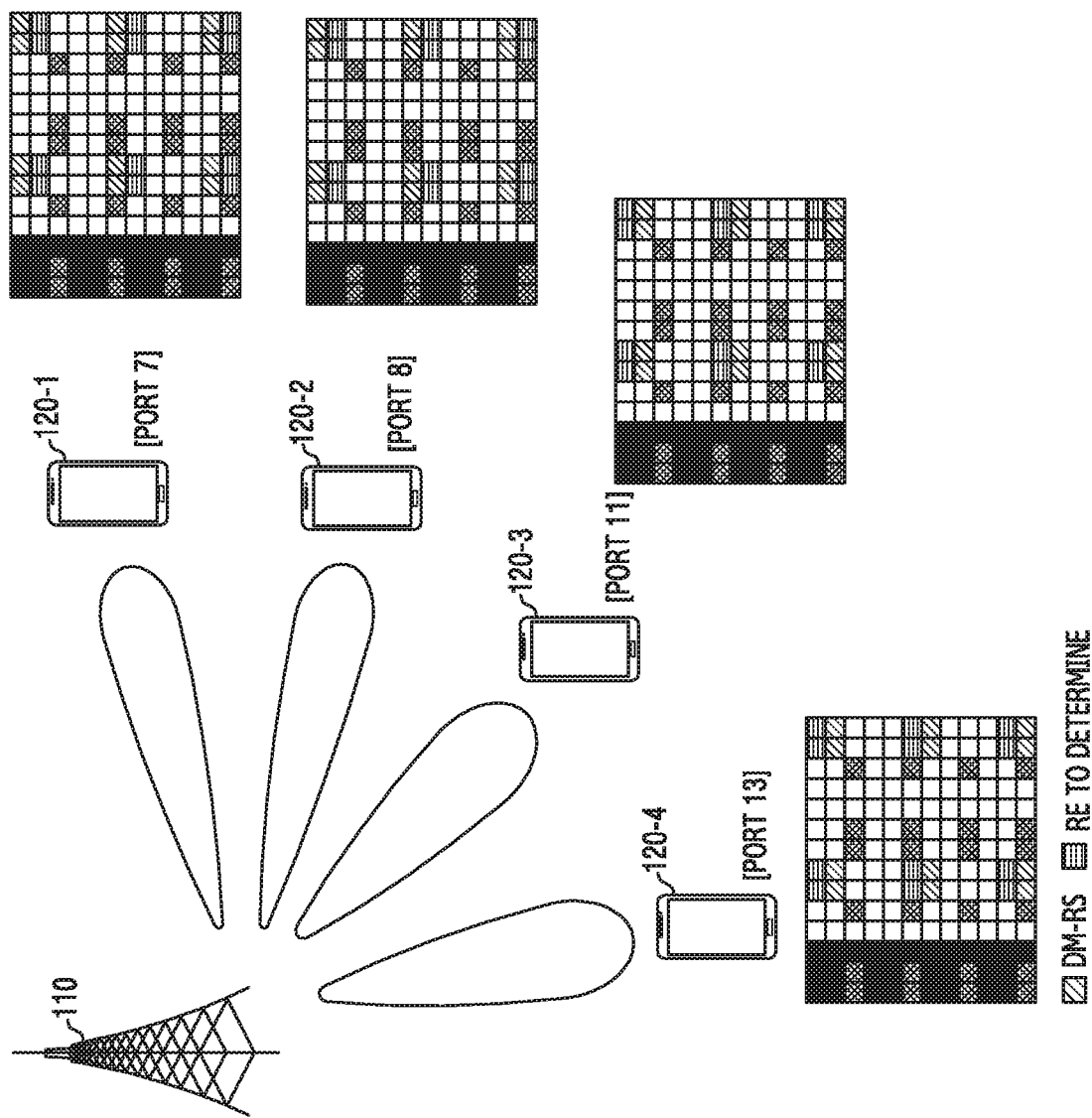
FIG. 13 depicts an example of a situation where four antenna ports are used for two CDM groups in a wireless communication system according to an embodiment of the present invention.

FIG. 13 depicts an example of a situation where four antenna ports are used for two CDM groups in a wireless communication system according to an embodiment of the present invention. Referring to FIG. 13, a base station 110 communicates with terminals 120-1 through 120-4. In so doing, the terminal 120-1 uses an antenna port 7, the terminal 120-2 uses an antenna port 8, the terminal 120-3 uses an antenna port 9, and the terminal 120-4 uses an antenna port 10. The antenna ports 7 and 8 belong to a first CDM group, and the antenna ports 9 and 10 belong to a second CDM group.

That is, to support MU-MIMO transmission for the four terminals, four orthogonal reference signal ports are needed. For doing so, two CDM groups can be used, and the reference signal ports 7/8/9/10 can be used as shown in FIG. 13. In this case, since two CDM groups are used, the number of the CDM groups used can vary according to the number of the terminals for the MU-MIMO. For example, when the terminal 120-1 and the terminal 120-2 communicate using the MU-MIMO, the second CDM group is not required. By contrast, when all of the terminal 120-1, the terminal 120-2, the terminal 120-3, and the terminal 120-4 communicate using the MU-MIMO, both of the first CDM group and the second CDM group are required. When the number of the CDM groups varies, data channel (e.g., Physical Downlink Shared Channel (PDSCH)) mapping can change or a power boosting value for the reference signals can change.

A data channel mapping problem according to the use of the two CDM groups are as follows. Referring to FIG. 13, the MU-MIMO transmission for the terminals 120-1 through 120-4 is supported through the two CDM groups. The terminal 120-1 belongs to the first CDM group and uses the antenna port 7, the terminal 120-2 belongs to the first CDM group and uses the antenna port 8, the terminal 120-3 belongs to the second CDM group and uses the antenna port 9, and the terminal 120-4 belongs to the second CDM group and uses the antenna port 10. At this time, hatched REs are resource for delivering reference signals for a terminal belonging to other CDM group, and need to be determined by each terminal. More specifically, it can be ambiguous for the terminal 120-1 belonging to the first CDM group to determine whether to interpret REs carrying the reference signals of the second CDM group as the reference signals for the terminals 120-3 and 120-4 belonging to the second CDM group or its data. That is, the interpretation on the data signal mapping can be ambiguous. The terminals 120-3 and 120-4 belonging to the second CDM group can be also subject to similar ambiguity.

Thus, the present invention suggests embodiments which i) interprets as reference signal transmission, ii) interprets as data signal transmission, or iii) interprets in consideration of both cases in REs which can carry reference signals of other CDM group.

Figure 14:
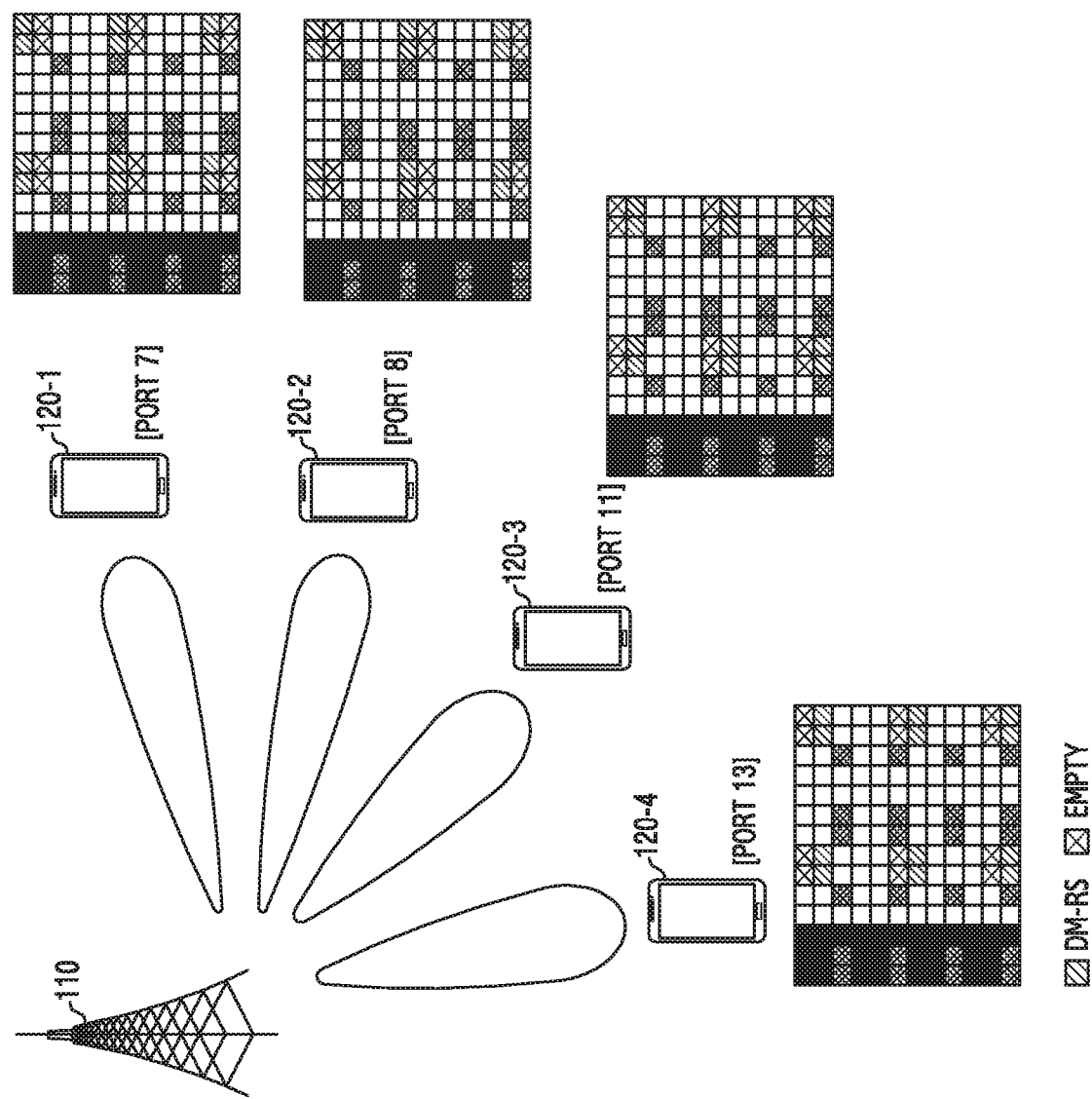
FIG. 14 depicts an example of an interpretation of reference signal resources for other group in a wireless communication system according to an embodiment of the present invention.

The case where the REs for delivering the reference signals of the other CDM group transmit the reference signals is illustrated in FIG. 14. That is, as shown in FIG. 14, each terminal can assume a CDM group not allocated to it as a reference signal port of other terminals.

FIG. 14 depicts an example of an interpretation of reference signal resources for other group in a wireless communication system according to an embodiment of the present invention. In FIG. 14, REs marked with 'x' are interpreted as empty REs by a corresponding terminal. Referring to FIG. 14, a base station 110 performs MU-MIMO transmission to four terminals 120-1 through 120-4. In so doing, terminals 120-1 through 120-4 interpret data signal mapping that data signals are not mapped to the REs carrying the reference signals of the other CDM group. Hence, the terminals 120-1 through 120-4 exclude REs carrying the reference signals of its CDM group and the other CDM group, and detect signals received on other REs. The interpretation of FIG. 14 estimates the reference signal port of other terminal, which can be advantageous in a receiving device design for controlling interference between terminals occurring in the MU-MIMO transmission. In the interpretation of FIG. 14, the terminals 120-1 through 120-4 each can operate as shown in FIG. 15.

Figure 15:
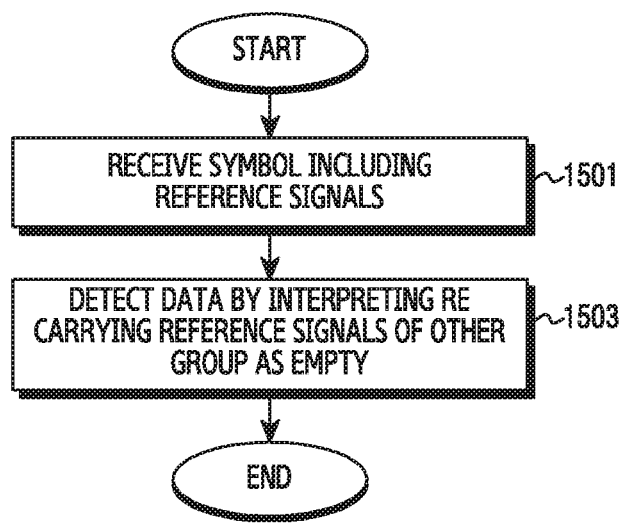
FIG. 15 depicts a detecting procedure which interprets a reference signal resource of other group as delivery of reference signals in a wireless communication system according to an embodiment of the present invention.

FIG. 15 depicts a detection procedure for interpreting a reference signal resource of other group as delivering reference signals in a wireless communication system according to an embodiment of the present invention. FIG. 15 illustrates an operating method of the terminal 120.

Referring to FIG. 15, the terminal receives a symbol including reference signals in step 1501. Some REs of the symbol include the reference signals, and some REs include data signals. At this time, some REs of the symbol include at least one RE for carrying reference signals of other group.

Next, the terminal interprets at least one RE for transmitting the reference signals of the other group as empty, and detects data in step 1503. That is, the terminal interprets at least one RE allocable for the reference signals of the other group as empty, and detects the data. That is, the terminal tries to detect data by excluding at the at least one REs and demodulating and decoding signals received on other REs.

Figure 16:
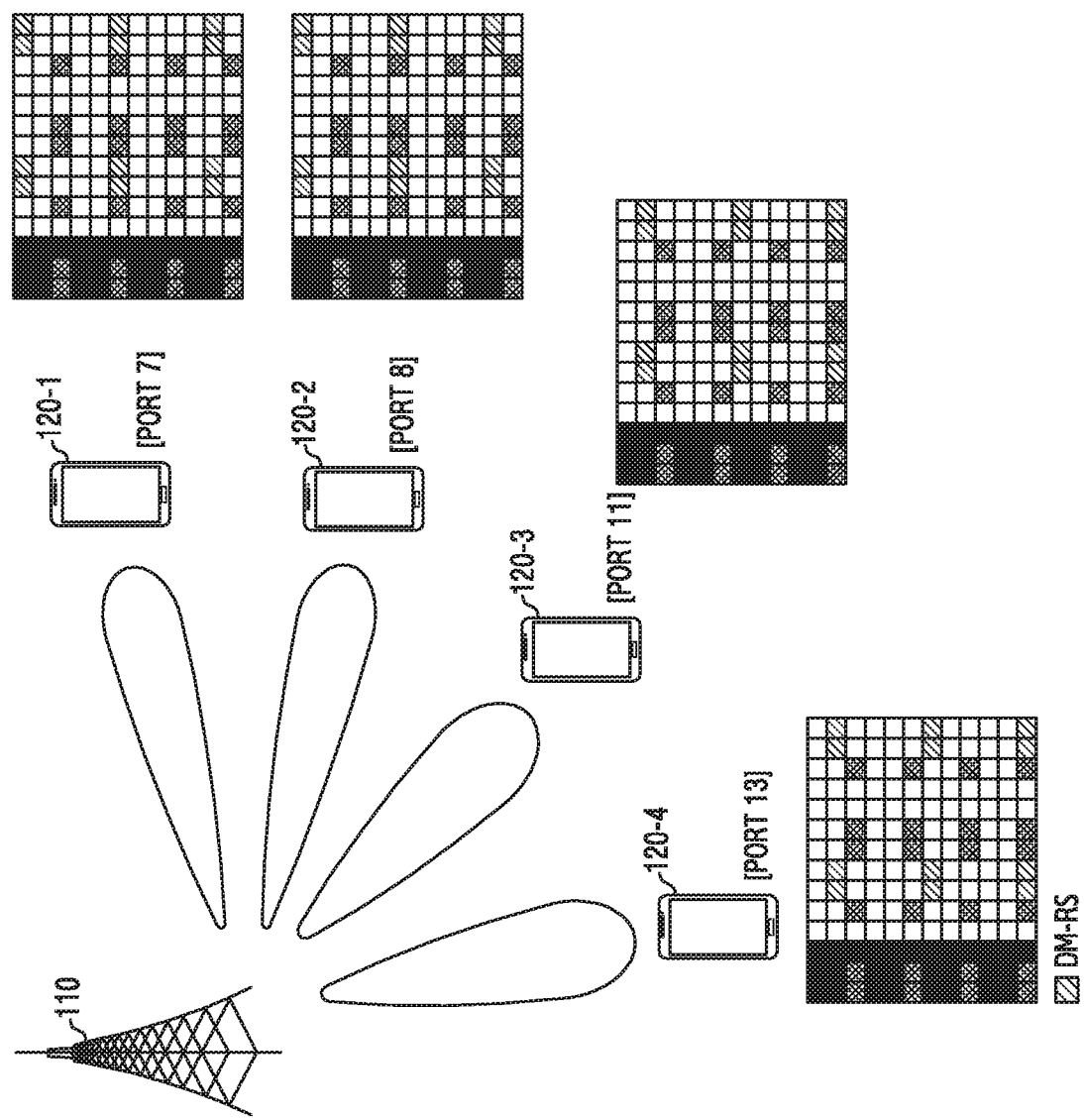
FIG. 16 depicts another example of an interpretation of reference signal resources for other group in a wireless communication system according to an embodiment of the present invention.

As an another embodiment of FIG. 14, a case where REs for delivering reference signals of other CDM group transmit data signals is illustrated in FIG. 16. That is, as shown in FIG. 16, each terminal can assume a CDM group not allocated to it as its data channel.

FIG. 16 depicts another example of an interpretation of reference signal resources for other group in a wireless communication system according to an embodiment of the present invention. Referring to FIG. 16, a base station 110 performs MU-MIMO transmission to four terminals 120-1 through 120-4. In so doing, the terminals 120-1 through 120-4 interpret data signal mapping that data signals are mapped to the REs for delivering reference signals of other CDM group. Hence, the terminals 120-1 through 120-4 detect signals received on REs including resources for carrying reference signals of its allocated CDM group and another CDM group. While the terminals 120-1 through 120-4 interpret a CDM group not allocated to it as a data channel, the base station 110 can apply data channel muting in a corresponding RE and utilize for the reference signal transmission for other terminal. In this case, while the terminals 120-1 through 120-4 interpret a corresponding RE as the data channel, they receive a signal which actually causes an error, that is, a reference signal for other terminal and thus data detection performance can degrade. Accordingly, in consideration of such a situation, the base station 110 can aid in the successful detection by pre-adjusting a Modulation and Coding Scheme (MCS) level applied to the data destined for the terminals 120-1 through 120-4. In the interpretation of FIG. 16, the base station 110 can operate as show in FIG. 17 and the terminals 120-1 through 120-4 each can operate as shown in FIG. 18.

Figure 17:
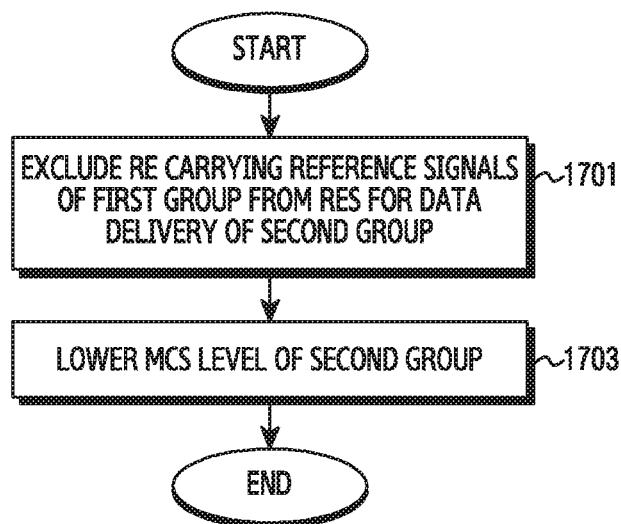
FIG. 17 depicts a data processing procedure for a terminal to interpret a reference signal resource of other group as delivery of data signals in a wireless communication system according to the present invention.
Figure 18:
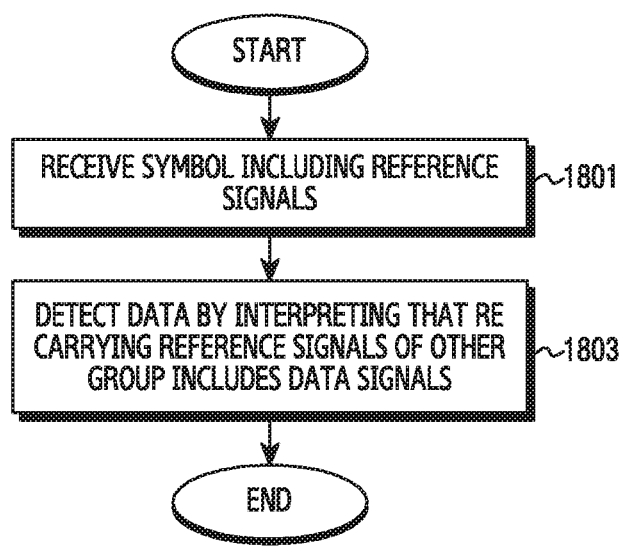
FIG. 18 depicts a detecting procedure which interprets a reference signal resource of other group as delivery of data signals in a wireless communication system according to an embodiment of the present invention.

FIG. 17 depicts a data processing procedure for a terminal which interprets a reference signal resource of other group as delivering data signals in a wireless communication system according to the present invention. FIG. 17 illustrates an operating method of the base station 110.

Referring to FIG. 17, the base station excludes at least one RE carrying reference signals of a first group from REs for data delivery of a second group in step 1701. That is, the base station allocates a resource for the data transmission of the second group in a range of other REs excluding at least one RE carrying the reference signals of the first group.

Next, the base station lowers an MCS level of the second group in step 1703. According to this embodiment, a terminal belonging to the second group interprets that data signals to the terminal are mapped to the at least one RE carrying the reference signals of the first group. However, since the data signals are not mapped to the at least one RE, a detection error probability of the terminal increases. Hence, the base station can conduct more robust coding and modulation by lowering the MCS level so as to overcome the detection error probability increase due to the at least one RE.

FIG. 18 depicts a detection procedure which interprets a reference signal resource of other group as delivery of data signals in a wireless communication system according to an embodiment of the present invention. FIG. 18 illustrates an operating method of the terminal 120.

Referring to FIG. 18, the terminal receives a symbol including reference signals in step 1801. Some REs of the symbol include the reference signals, and some REs include data signals. At this time, some REs of the symbol include at least one RE for carrying reference signals of other group.

Next, the terminal interprets that data signals are mapped to at least one RE for carrying the reference signals of the other group, and detects data in step 1803. That is, the terminal detects data by interpreting that at least one data signal for the terminal is mapped to at least one RE allocable for the reference signals of the other group. That is, the terminal tries the data detection by demodulating and decoding signals received over a plurality of REs including the at least one RE. In so doing, when the reference signals for the other group are mapped to the at least one RE, a detection error can occur.

Figure 19:
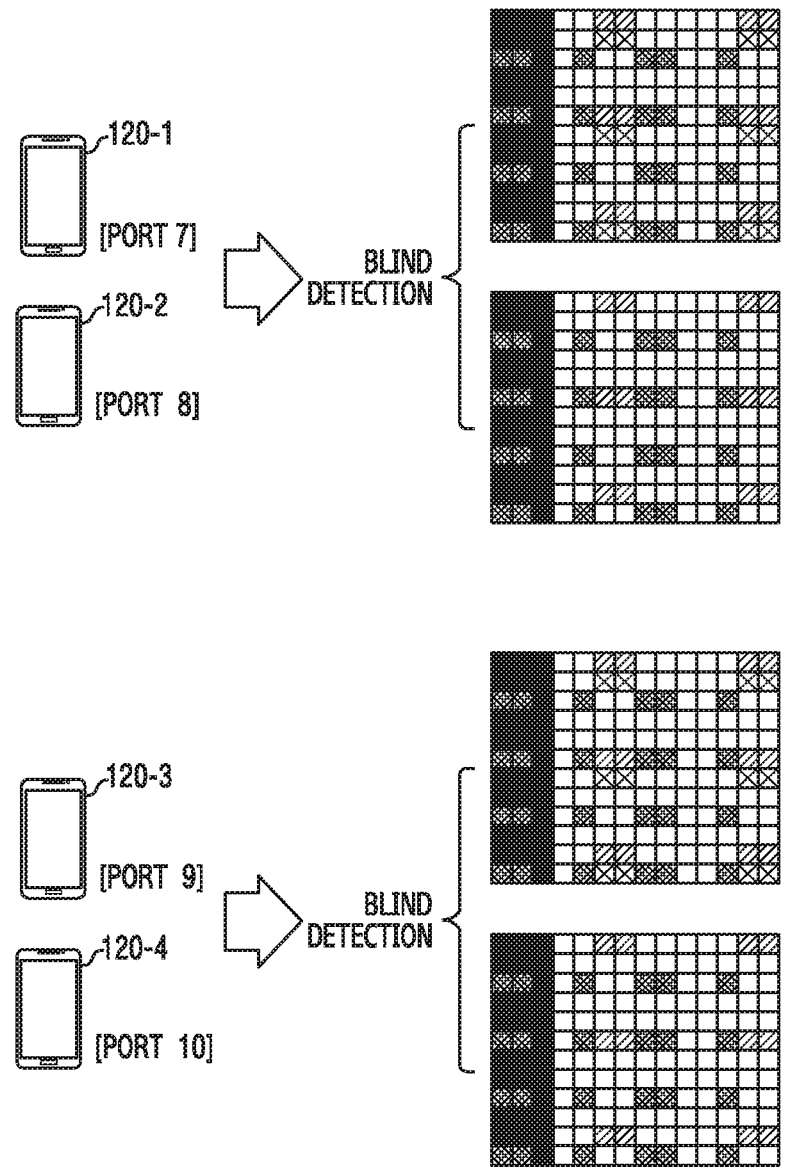
FIG. 19 depicts yet another example of an interpretation of reference signal resources for other group in a wireless communication system according to an embodiment of the present invention.

As yet another embodiment of FIG. 14 and FIG. 16, blind detection is performed on REs for carrying reference signals of other CDM group in FIG. 19. That is, as shown in FIG. 19, depending on the blind detection, each terminal can interpret a reference signal resource of a CDM group not allocated to it.

FIG. 19 depicts yet another example of an interpretation of reference signal resources for other group in a wireless communication system according to an embodiment of the present invention. Referring to FIG. 19, the terminals 120-1 through 120-4 receive a signal without information about reference signal port mapping conducted by a base station 110. That is, the base station 110 adjusts the number of CDM groups according to the number of the terminals, and the terminals 120-1 through 120-4 can repeat detection corresponding to every possible situation and then determine that a situation corresponding to the successful detection as the reference signal port mapping conducted by the base station 110. More specifically, as first detection, the terminals 120-1 through 120-4 exclude REs for carrying reference signals of their allocated CDM group and other CDM group and detect a signal received over other REs. As second detection, the terminals 120-1 through 120-4 detect a signal received over REs including resources for carrying the reference signals of their allocated CDM group and the other CDM group. Next, the terminals 120-1 through 120-4 can select a detection result successfully decoded without error during the primary detection and the secondary detection as a final detection result. In the interpretation of FIG. 19, the terminals 120-1 through 120-4 each can operate as shown in FIG. 20.

Figure 20:
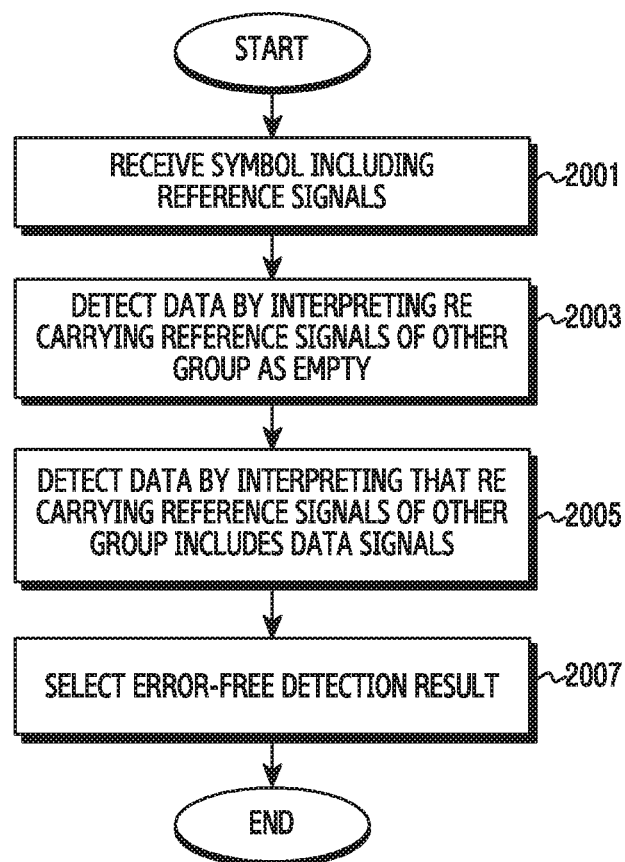
FIG. 20 depicts a blind detection procedure considering a reference signal resource of other group in a wireless communication system according to an embodiment of the present invention.

FIG. 20 depicts a blind detection procedure considering a reference signal resource of other group in a wireless communication system according to an embodiment of the present invention. FIG. 20 illustrates an operating method of the terminal 120.

Referring to FIG. 20, the terminal receives a symbol including reference signals in step 2001. Some REs of the symbol include the reference signals, and some REs include data signals. At this time, some REs of the symbol include at least one RE for carrying reference signals of other group.

Next, the terminal interprets at least one RE for transmitting the reference signals of the other group as empty, and detects data in step 2003. That is, the terminal tries to detect data by excluding the at least one REs and demodulating and decoding signals received on other REs.

Next, the terminal interprets that data signals are mapped to at least one RE for carrying reference signals of the other group, and detects data in step 2005. That is, the terminal tries to detect data by demodulating and decoding signals received over a plurality of REs including the at least one RE.

Next, the terminal selects an error-free detection result in step 2007. That is, in the step 2003 and the step 2005, the terminal performed the detection twice while not knowing which signals are mapped to the at least one RE for carrying the reference signals of the other group. Accordingly, the terminal can determine a signal corresponding to the successful detection as the signal transmitted by the base station, and adopt a corresponding detection result. For example, the error can be determined by Cyclic Redundancy Check (CRC).

In the embodiment of FIG. 20, the terminals 120-1 through 120-4 perform the blind detection regardless of the allocated antenna port. However, according to still another embodiment of the present invention, the terminals 120-1 through 120-4 can selectively conduct the blind detection according to the allocated antenna port or the CDM group. That is, the terminals 120-1 through 120-4 can perform the blind detection only when a particular port is allocated. For example, when a port 9 or 10 of a second CDM group is allocated, the terminal can interpret a first CDM group as reference signals. This is because the use of the port 9/10 means that the first CDM group is allocated. By contrast, when a port 7 or 8 of the first CDM group is allocated, the terminal determines whether another CDM group is used as reference signals for another terminal or as its data channel through the blind detection.

As still another embodiment of FIG. 14, FIG. 16, and FIG. 19, control information notifying of whether the REs for carrying the reference signals of the other CDM group transmit reference signals or data signals can be provided. That is, the base station can inform of whether or not other CDM group is used, using the control information. For example, the control information can be transmitted through a Radio Resource Control (RRC) signal of long duration, or through a control channel (e.g., PDCCH) per subframe. In this case, the base station can operate as shown in FIG. 21, and the terminal can operate as shown in FIG. 22.

Figure 21:
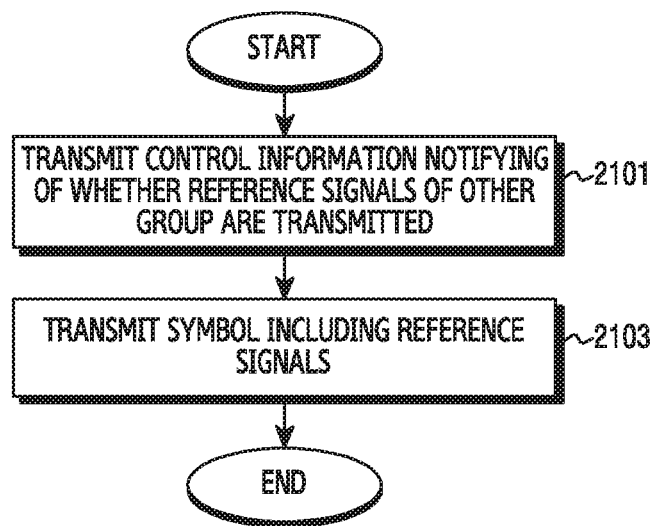
FIG. 21 depicts a reference signal transmitting procedure based on control information notifying a use of a reference signal resource of other group in a wireless communication system according to an embodiment of the present invention.
Figure 22:
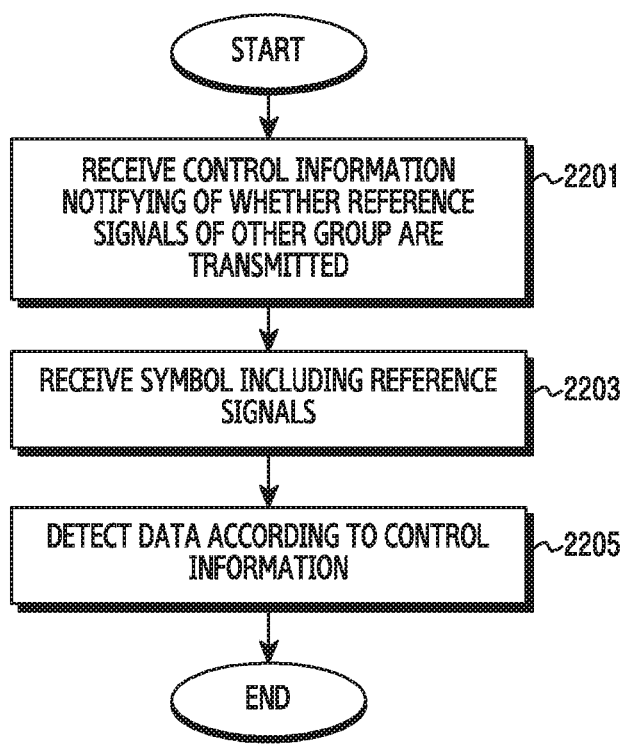
FIG. 22 depicts a reference signal receiving procedure based on control information notifying a use of a reference signal resource of other group in a wireless communication system according to an embodiment of the present invention.

FIG. 21 depicts a reference signal transmitting procedure based on control information notifying use of a reference signal resource of other group in a wireless communication system according to an embodiment of the present invention. FIG. 21 illustrates an operating method of the base station 110.

Referring to FIG. 21, the base station transmits control information notifying of whether reference signals of other group are transmitted in step 2101. The control information can be transmitted through an RRC message or in the form of Downlink Control Information (DCI) over a control channel of a subframe. That is, the control information notifies a terminal belonging to a first group of whether reference signals for a second group are transmitted, and notifies a terminal belonging to a second group of whether reference signals for the first group are transmitted.

Next, the base station transmits a symbol including the reference signals in step 2103. Some REs of the symbol include the reference signals, and some REs include data signals. In so doing, some REs of the symbol include at least one RE for delivering reference signals of other group. If the control information indicates the transmission of the reference signals of the other group, the reference signals for the other group are mapped to the at least one RE. When the control information indicates no transmission of the reference signals of the other group, the data signals for the group are mapped to the at least one RE.

FIG. 22 depicts a reference signal receiving procedure based on control information notifying use of a reference signal resource of other group in a wireless communication system according to an embodiment of the present invention. FIG. 22 illustrates an operating method of the terminal 120.

Referring to FIG. 22, the terminal receives control information notifying of whether reference signals of other group are transmitted in step 2201. The control information can be transmitted through an RRC message or as DCI over a control channel of a subframe. That is, the control information notifies a terminal belonging to a first group of whether reference signals for a second group are transmitted, and notifies a terminal belonging to the second group of whether reference signals for the first group are transmitted. For example, the control information can explicitly indicate whether the reference signals for the other group (e.g., the first group or the second group) are transmitted, or whether muting is applied to a data channel of a corresponding group.

Next, the terminal receives a symbol including the reference signals in step 2203. Some REs of the symbol include the reference signals, and some REs include data signals. In so doing, some REs of the symbol include at least one RE for delivering the reference signals of the other group. If the control information indicates the transmission of the reference signals of the other group, the terminal interprets that the reference signals for the other group are mapped to the at least one RE. If the control information indicates no transmission of the reference signals of the other group, the terminal interprets that data signals for the terminal are mapped to the at least one RE.

Next, the terminal detects data according to the control information in step 2205. If the control information indicates the transmission of the reference signals of the other group, the terminal interprets the at least one RE as empty, and detects the data. That is, the terminal tries to detect the data by excluding the at least one REs and demodulating and decoding signals received on other REs. By contrast, when the control information indicates no transmission of the reference signals of the other group, the terminal interprets that the data signals are mapped to the at least one RE, and detects the data. That is, the terminal tries the data detection by demodulating and decoding signals received on a plurality of REs including the at least one REs.

When four reference signals ports are used for two CDM groups, there is another problem about the power difference between the reference signals and the data signals besides the problem about the aforementioned interpretation of the reference signals for the other group. That is, when four orthogonal reference signals are supported using two CDM groups, yet another problem is that a power boosting value of the reference signals can change. Specifically, the power boosting problem is shown in FIGS. 23A and 23B.

Figure 23B:
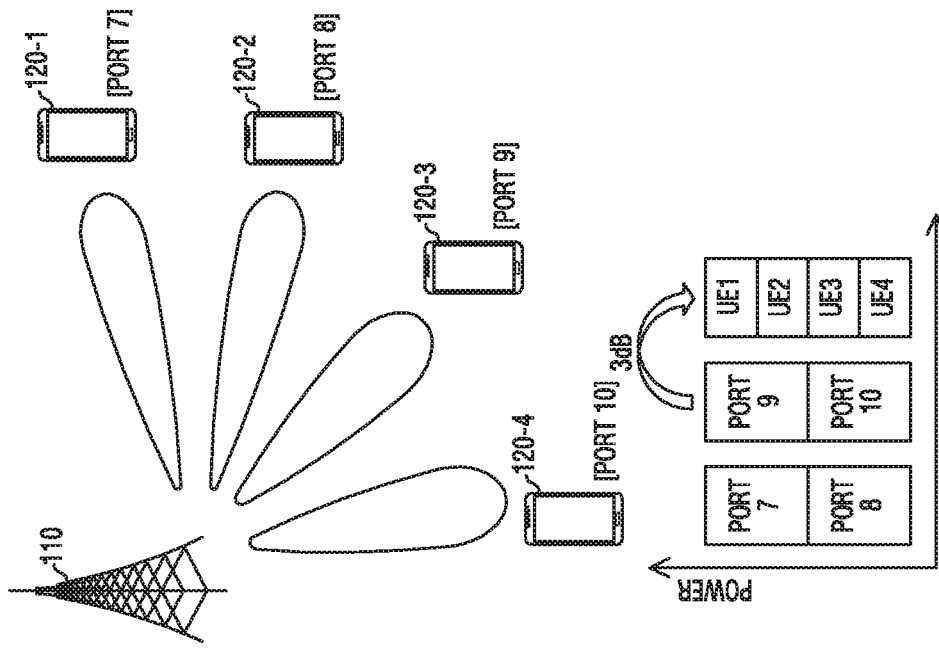
FIGS. 23A and 23B depict power difference between reference signals and data signals according to the number of terminals in a wireless communication system according to an embodiment of the present invention.
Figure 23A:
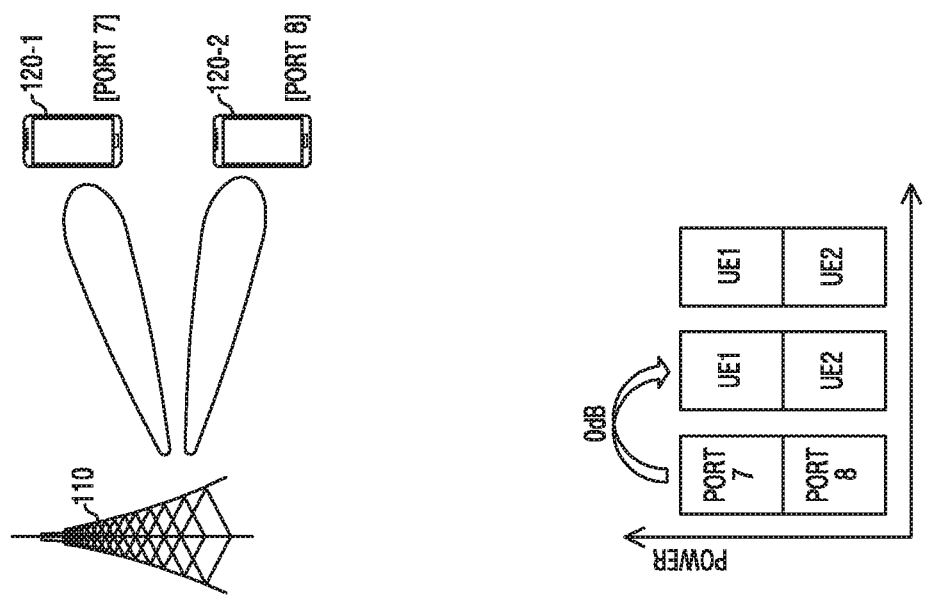

FIGS. 23A and 23B depict power difference between reference signals and data signals according to the number of terminals in a wireless communication system according to an embodiment of the present invention. FIG. 23A shows MU-MIMO transmission to two terminals 120-1 and 120-2, and FIG. 23B shows MU-MIMO transmission to four terminals 120-1 through 120-4.

Referring to FIG. 23A, when only one CDM group is used, two reference signals are multiplexed and two data signals are multiplexed in the same resource. That is, since the number of the reference signals and the number of the data signals transmitted on the same resource are the same, a difference of a reference signal power and a data channel power in MU-MIMO transmission can be 0 dB.

However, as shown in FIG. 23B, when two CDM groups are used, two reference signals are multiplexed and four data signals are multiplexed in the same resource. That is, since the number of the data signals transmitted on the same resource is greater than the number of the reference signals. Accordingly, the data signals can be transmitted with ¼ power of an available power, and the reference signals can be transmitted with ½ power of the available power. As a result, when two CDM groups are used, the reference signal power can be greater than the data signal by 3 dB. In this case, for accurate channel estimation, the base station 110 needs to transmit power boosting information of the reference signals to the terminals 120-1 through 120-4.

That is, as shown in FIGS. 23A and 23B, the power difference between the reference signals and the data signals can differ according to the number of the terminals participating in the MU-MIMO transmission. That is, for a terminal allocated a port 7/8, since two power differences of 0 dB or 3 dB can exhibit, the power boosting value of the reference signals needs to be determined.

As an embodiment of the power boosting value, the power difference between the reference signals and the data signals is fixed in FIGS. 24A and 24B. FIGS. 24A and 24B depict an example of a fixed power boosting value of reference signals in a wireless communication system according to an embodiment of the present invention.

Referring to FIGS. 24A and 24B, the power boosting value of the reference signals can be fixed to 0 dB as shown in FIG. 24A or to 3 dB as shown in FIG. 24B. In FIG. 24A, while MU-MIMO transmission is conducted to four terminals 120-1 through 120-4, since the power boosting value is fixed to 0 dB, a base station 110 transmits reference signals with half power of the available power. In FIG. 24B, while MU-MIMO transmission is conducted to two terminals 120-1 and 120-2, since the power boosting value is fixed to 3 dB, a base station 110 transmits reference signals with double power of the available power.

The power boosting value can be fixed as shown in FIGS. 24A and 24B. However, the power boosting value is fixed regardless of the number of the terminals, and can change as time passes. That is, in terms of management of the power boosting value, the power boosting value can be fixed in the system. Alternatively, the base station 110 can select the power boosting value from 0 dB or 3 dB, and transmit the power boosting value through an RRC signal delivered in long duration. Alternatively, the base station 110 can transmit the power boosting value over a control channel (e.g., PDCCH, ePDCCH) of a subframe allocating a resource to a corresponding terminal.

As another embodiment of the power boosting value, the determination of the power boosting value can rely on blind detection of the terminal. That is, the base station adjusts the power boosting value for the reference signals according to the number of the terminal participating in the MU-MIMO, and the terminal repeatedly performs the detection based on every possible reception situation and then determines a power boosting value corresponding to successful reception as the power boosting value applied by the base station. In this case, the terminal can operate as shown in FIG. 25.

Figure 25:
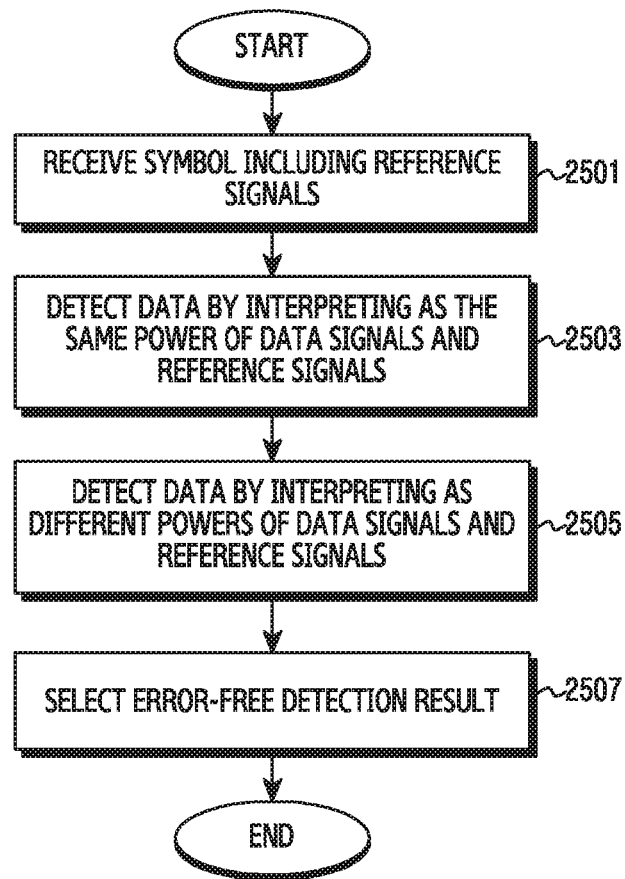
FIG. 25 depicts blind detection in consideration of power difference between reference signals and data signals in a wireless communication system according to an embodiment of the present invention.

FIG. 25 depicts blind detection in consideration of power difference between reference signals and data signals in a wireless communication system according to an embodiment of the present invention. FIG. 25 illustrates an operating method of the terminal 120.

Referring to FIG. 25, the terminal receives a symbol including reference signals in step 2501. Some REs of the symbol include the reference signals, and some REs include data signals.

Next, the terminal interprets as the same power of the data signals and the reference signals and detects data in step 2503. In other words, the terminal interprets a power boosting value of the reference signals as 0 dB. That is, the terminal applies a size of channel information estimated through the reference signals to equalization of the data signals without scaling, demodulates and decodes the data signals, and thus attempts the data detection. Namely, the terminal compensates for distortion of the data signals using the channel information as it is.

Next, the terminal differently interprets the powers of the data signals and the reference signals, and detects data in step 2505. For example, the terminal interprets the power boosting value of the reference signals as 3 dB. That is, the terminal scales the size of the channel information estimated through the reference signals, applies the scaled channel information to the equalization of the data signals, demodulates and decodes the data signals, and thus attempts the data detection. Namely, the terminal compensates for distortion of the data signals using the channel information of the size adjusted according to the power boosting value.

Next, the terminal selects an error-free detection result in step 2507. That is, in the step 2503 and the step 2505, the terminal conducts the detection twice without knowing the power difference of the reference signals and the data signals, that is, the power boosting value applied to the reference signals. Hence, the terminal can determine the power boosting value corresponding to the successful detection as the power boosting value applied by the base station, and adopt a corresponding detection result. For example, the error can be determined using CRC.

As in the embodiment of FIG. 25, the terminal can determine the power boosting value applied to the reference signals through the blind detection. However, the power boosting value is not always necessary. The effect of the power boosting value can vary according to a modulation scheme. For example, a modulation scheme which distinguishes complex symbols merely with the phase may not be greatly affected in the signal size. Thus, according to another embodiment of the present invention, selective blind detection of FIG. 26 is feasible.

Figure 26:
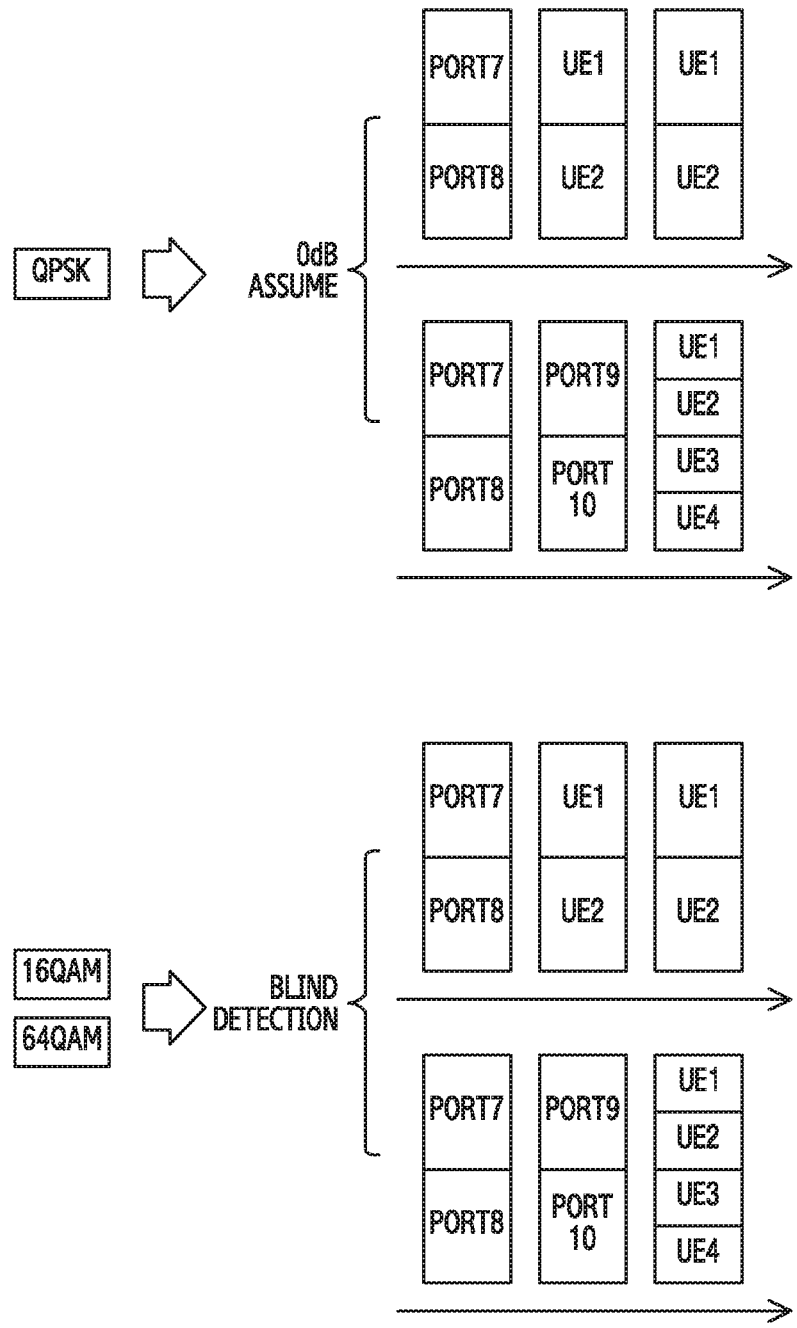
FIG. 26 depicts selective blind detection in consideration of a modulation scheme in a wireless communication system according to an embodiment of the present invention.

FIG. 26 depicts selective blind detection in consideration of a modulation scheme in a wireless communication system according to an embodiment of the present invention. FIG. 26 illustrates a case where quadrature phase shift Keying (QPSK), 16 quadrature amplitude modulation (QAM), and 64QAM are used as the modulation scheme. Referring to FIG. 26, since the QPSK is the modulation scheme using only the phase, when the QPSK is used, a terminal can assume a power boosting value as 0 dB. Alternatively, the terminal can assume the power boosting value as 3 dB. That is, when a modulation scheme applied to data signals transmitted to the terminal does not use the magnitude (e.g., when applying the QPSK), the terminal can interpret the power boosting value as a predefined value and not perform the blind detection. The 16QAM and the 64QAM are the modulation schemes using the phase and the magnitude, when the 16QAM and the 64QAM are used, the terminal performs the blind detection considering a plurality of power boosting values.

That is, according to the embodiment of FIG. 26, the terminal determines whether to conduct the blind detection according to the MCS level allocated to it. When the blind detection is unnecessary, that is, when the modulation scheme (e.g., QPAK, Binary Phase Shift Keying (BPSK)) using only the phase is used, the terminal interprets and detects the power booting value as a single value. By contrast, when the blind detection is necessary, that is, when the modulation scheme (e.g., 16QAM, 64QAM, 124QAM) using the phase and the magnitude is used, the terminal performs a procedure of FIG. 25.

As another embodiment for the power boosting value, control information notifying the power boosting value applied to the reference signals can be provided. That is, the base station can notify the power boosting value through the control information. For example, the control information can be transmitted through an RRC signal of long duration or a control channel (e.g., PDCCH) per subframe. In this case, the base station can operate as shown in FIG. 27, and the terminal can operate as shown in FIG. 28.

Figure 27:
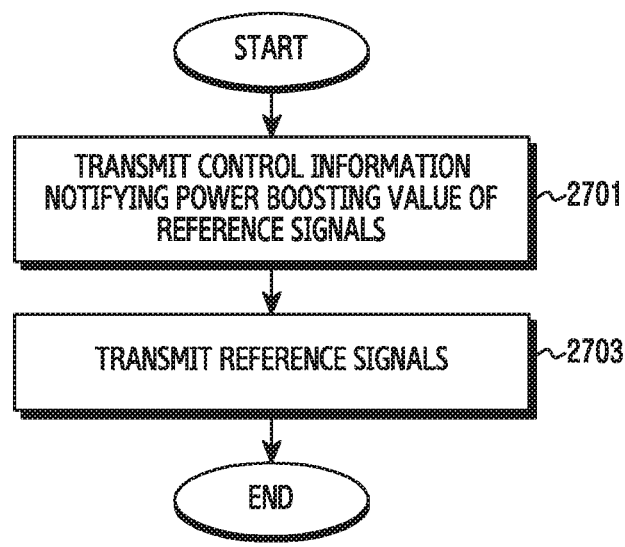
FIG. 27 depicts a reference signal transmitting procedure based on control information notifying a power boosting value in a wireless communication system according to an embodiment of the present invention.
Figure 28:
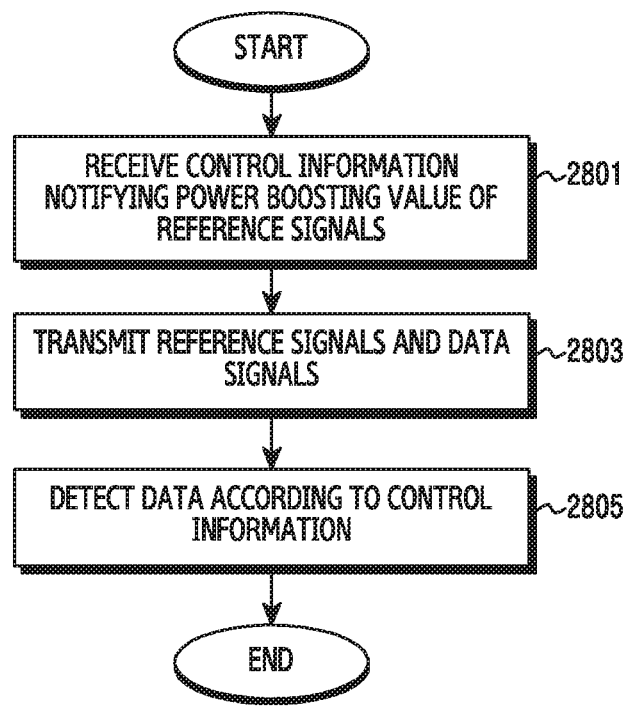
FIG. 28 depicts a reference signal receiving procedure based on control information notifying a power boosting value in a wireless communication system according to an embodiment of the present invention.

FIG. 27 depicts a reference signal transmitting procedure based on control information notifying a power boosting value in a wireless communication system according to an embodiment of the present invention. FIG. 27 illustrates an operating method of the base station 110.

Referring to FIG. 27, the base station transmits control information indicating a power boosting value applied to reference signals in step 2701. Herein, the power boosting value indicates a power difference between reference signals and data signals. The power boosting value can vary according to the number of terminals multiplexed in the same resource, that is, participating in MU-MIMO transmission. Hence, the base station determines the power boosting value based on the number of the terminals participating in the MU-MIMO transmission, and transmits the control information indicating the power boosting value. For example, the control information can include information explicitly indicating the power boosting value, or information notifying the number of the terminals participating in the MU-MIMO transmission.

Next, the base station transmits reference signals in step 2703. In so doing, the base station transmits the reference signals with power corresponding to the power boosting value. That is, the base station adjusts the power of the reference signals according to the power boosting value indicated by the control information.

FIG. 28 depicts a reference signal receiving procedure based on control information notifying a power boosting value in a wireless communication system according to an embodiment of the present invention. FIG. 28 illustrates an operating method of the terminal 120.

Referring to FIG. 28, the terminal receives control information indicating a power boosting value applied to reference signals in step 2801. Herein, the power boosting value indicates a power difference between reference signals and data signals. The power boosting value can vary according to the number of terminals multiplexed in the same resource, that is, participating in MU-MIMO transmission. For example, the control information can include information explicitly indicating the power boosting value, or information notifying the number of the terminals participating in the MU-MIMO transmission.

Next, the terminal receives reference signals and data signals in step 2803. In so doing, the base station transmits the reference signals with power corresponding to the power boosting value. That is, the reference signals are transmitted with the power adjusted according to the power boosting value indicated by the control information. In other words, the reference signals and the data signals are transmitted with a power level corresponding to the power boosting value.

Next, the terminal detects data according to the control information in step 2805. If the control information indicates the same power of the reference signals and the data signals, the terminal interprets the same power of the reference signals and the data signals and detects data. In other words, the terminal interprets the power boosting value of the reference signals as 0 dB, and applies a size of channel information estimated through the reference signals to equalization of the data signals without scaling. By contrast, when the control information indicates different powers of the reference signals and the data signals, the terminal interprets different powers of the data signals and the reference signals and detects data. For example, the terminal interprets the power boosting value of the reference signals as 3 dB, scales the size of the channel information estimated through the reference signals, and then applies the scaled channel information to the equalization of the data signals.

As mentioned above, when two CDM groups are used, data channel muting by reference signals of other group or the power boosting value of the reference signals can be provided as the control information. Further, the data channel muting and the power boosting value can be provided together. For example, when the terminal uses other CDM group as its data channel, the terminal can interpret the power boosting value as 0 dB. Similarly, when the terminal uses other CDM group as a reference signal port for other terminal, the terminal can interpret the power boosting value as 3 dB. Additionally, the control information configuration as described above can be applied only to a particular reference signal port. For example, the control information can be configured as shown in Table 7.

TABLE 7

| value | RS port | Muting | Power boosting value | remarks |
|---|---|---|---|---|
| 0 | port 7 | Used as data channel | 0 dB | 1 or 2 terminals |
| 1 | port 8 | Used as data channel | 0 dB | 1 or 2 terminals |
| 2 | port 7 | Used as RS | 3 dB | 3 or 4 terminals |
| 3 | port 8 | Used as RS | 3 dB | 3 or 4 terminals |
| 4 | port 9 | Used as RS | 3 dB | 3 or 4 terminals |
| 5 | port 10 | Used as RS | 3 dB | 3 or 4 terminals |

In Table 7, 'value' is the value transmitted as the control information, and 'muting' and 'power boosting value' are corresponding parameters.

Referring to FIG. 5 and FIG. 6, before the reference signals are transmitted/received, the control information of the reference signals is transmitted/received. According to the current G3PP LTE standard, the control information for the reference signal port allocation is delivered over the control channel (e.g., PDCCH), and one information is provided for the allocated frame. Hence, in the subframe, the reference signal port information is equally applied to every resource allocated to the terminal. However, the subframe unit allocation scheme can cause resource inefficiency as shown in FIGS. 29A and 29B.

Figures 29A, 29B:
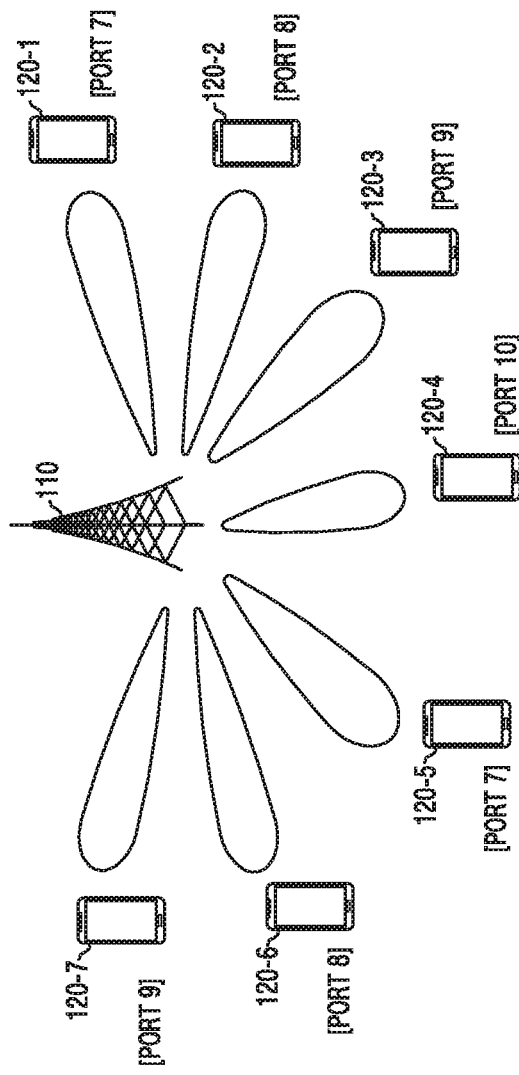
FIGS. 29A and 29B show an application example of subframe unit control information in a wireless communication system according to an embodiment of the present invention.

FIGS. 29A and 29B show an application example of subframe unit control information in a wireless communication system according to an embodiment of the present invention. FIG. 29A illustrates that a base station 110 communicates with seven terminals 120-1 through 120-7. Referring to FIG. 29A, the terminal 120-1 uses a port 7, the terminal 120-2 uses a port 8, the terminal 120-3 uses a port 9, the terminal 120-4 uses a port 10, the terminal 120-5 uses the port 7, the terminal 120-6 uses the port 8, and the terminal 120-7 uses the port 9. In so doing, as illustrated in FIG. 29B, the terminals 120-1 and 120-2 are multiplexed in a subband #1 2950-1, the terminals 120-1 through 120-4 are multiplexed in a subband #2 2950-2, the terminals 120-1 and 120-3 are multiplexed in a subband #3 2950-3, the terminals 120-1 and 120-5 are multiplexed in a subband #4 2950-4, the terminals 120-5 and 120-2 are multiplexed in a subband #5 2950-5, and the terminals 120-5 and 120-7 are multiplexed in a subband #6 2950-6. Referring to FIGS. 29A and 29B, as the port information is applied to all of the subbands 2950-1 through 2950-6, the two problems occur.

The first problem is that the port cannot move. For example, although the subband #3 2950-3 does not use the port 8, the terminal 120-3 cannot use the port 9 because the terminal 120-3 is using the port 9 in the subband #2 2950-2. This is because the allocated port cannot be designated per subband. When the port 8 and the port 9 belong to different CDM groups, the first problem can additionally waste the reference signal resource. The second problem is that a terminal combination not multiplexed occurs. For example, when MU-MIMO is to be transmitted to the terminal 120-1 and the terminal 120-5 through the subband #4 2950-4, since both of the terminal 120-1 and the terminal 120-5 use the port 7, the terminal 120-1 and the terminal 120-5 cannot be MU paired.

Such problems are caused because the control information for the reference signals is not provided per subband. That is, when only one reference signal port information is transmitted for the whole resource, scheduling of the base station can be limited. Hence, the present invention provides various embodiments for the control information configuration.

Figure 30:
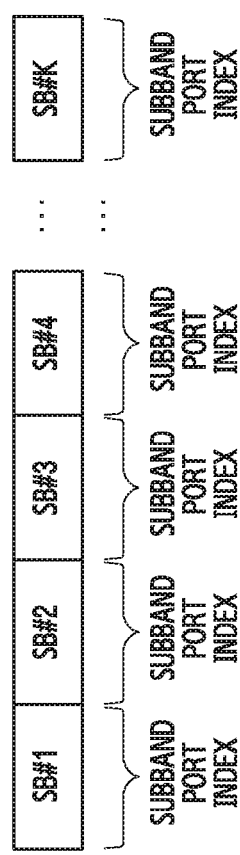
FIG. 30 depicts a configuration of subband unit control information in a wireless communication system according to an embodiment of the present invention.

According to an embodiment of the control information configuration for the reference signals, the control information is configured per subband as shown in FIG. 30. FIG. 30 depicts a configuration of subband unit control information in a wireless communication system according to an embodiment of the present invention. FIG. 30 shows control information for K-ary subbands.

Referring to FIG. 30, the control information includes a subband port index. The control information can further include other parameters not depicted in FIG. 30. That is, as shown in FIG. 30, the control information includes the port indexes corresponding to the subbands respectively. Accordingly, the base station can allocate the ports to terminals in different combinations for each subband.

Figure 31:
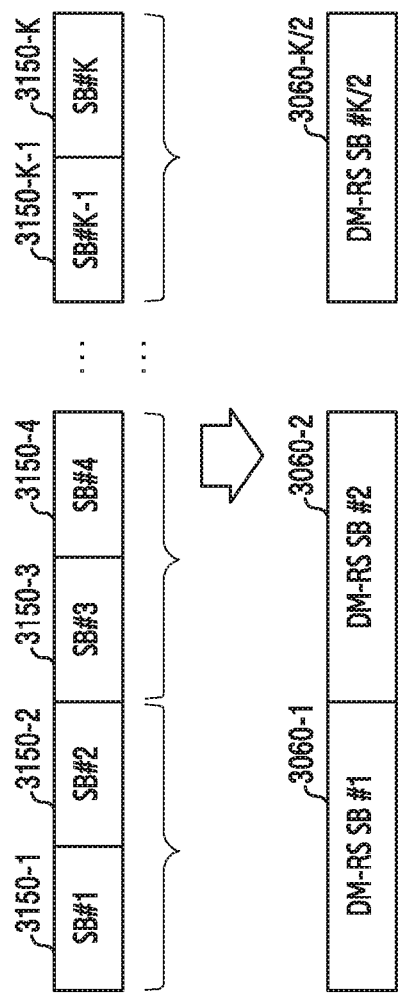
FIG. 31 depicts a configuration of resource group unit control information in a wireless communication system according to an embodiment of the present invention.

According to another embodiment of the control information configuration for the reference signals, the control information is configured per subband group as shown in FIG. 31. FIG. 31 depicts a configuration of resource group unit control information in a wireless communication system according to an embodiment of the present invention. FIG. 31 shows control information for K-ary subbands.

Referring to FIG. 31, K/2-ary resource groups 3160-1 through 3160-K/2 are formed from K-ary subbands 3150-1 through 3150-K. The resource group is an application unit of the control information for reference signals, and includes a plurality of subbands. In FIG. 31, one source group includes two subbands. However, according to various embodiments of the present invention, one resource group can include three or more subbands. The resource group can be referred to as a resource block group.

For doing so, resource group size information for reference signal port information transmission can be further added to resource group size information for legacy resource allocation. A specific value of the resource group size for the reference signals can be determined by considering trade-off between overhead of the control information and scheduling freedom of the base station.

The resource group size value can be predefined in the system, or transmitted through a long duration RRC signal. The resource group size for the reference signals can be referred to as '$I_{DM-RS}$'. Specifically, the base station can transmit a parameter indicating the resource group size for the reference signal port through the RRC signal. Hence, the terminal can determine the resource group size for the reference signal port transmission by multiplying the resource group size used for general resource allocation by the parameter. For example, when the resource group size used for the general resource allocation is P and the parameter for the reference signal port is $I_{DM-RS}$, the resource group size for the reference signal port transmission can be determined as $P \times I_{DM-RS}$. When the control information is configured as shown in FIG. 31, the base station can operate as shown in FIG. 32 and the terminal can operate as shown in FIG. 33.

Figure 32:
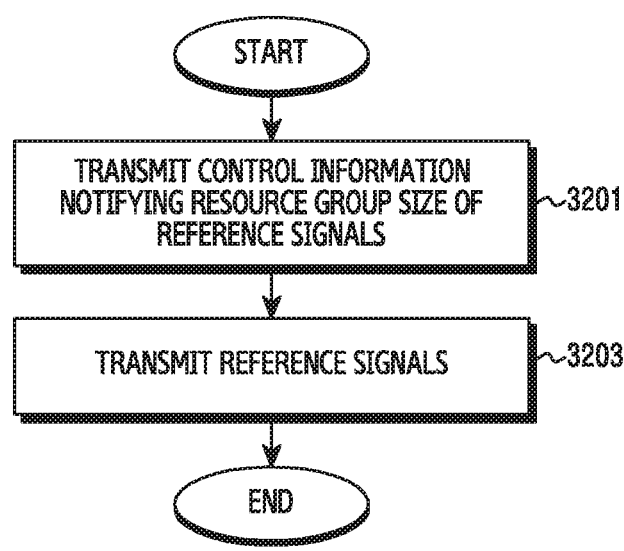
FIG. 32 depicts a reference signal transmitting procedure based on control information notifying a resource group size in a wireless communication system according to an embodiment of the present invention.
Figure 33:
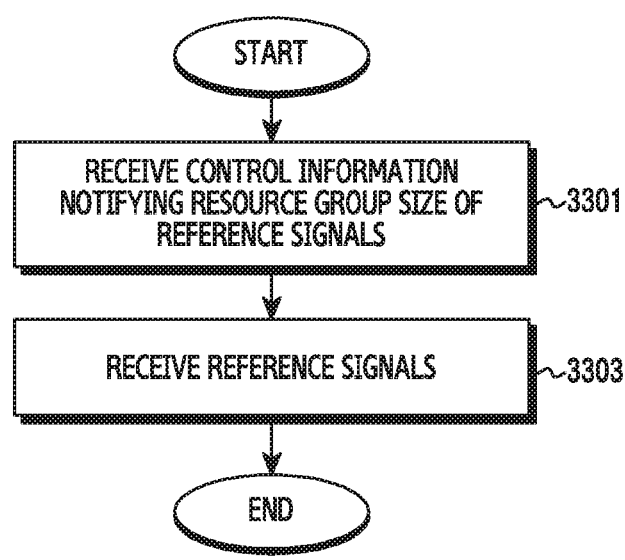
FIG. 33 depicts a reference signal receiving procedure based on control information notifying a resource group size in a wireless communication system according to an embodiment of the present invention.

FIG. 32 depicts a reference signal transmitting procedure based on control information notifying a resource group size in a wireless communication system according to an embodiment of the present invention. FIG. 32 illustrates an operating method of the base station 110.

Referring to FIG. 32, the base station transmits control information indicating a resource group size corresponding to control information of reference signals in step 3201. The resource group size indicates the number of subbands to which one control information is applied. The control information can be transmitted through an RRC message or as a DCI over a control channel of the subframe. Also, the control information can include allocation information of the reference signals, for example, an antenna port, a CDM group, and the like. That is, the control information includes a parameter indicating how many subbands the allocation information is applied to.

Next, the base station transmits reference signals in step 3203. In so doing, the base station applies the same allocation information in subbands of the resource group size indicated by the control information. That is, the base station can apply different configurations (e.g., CDM group, antenna port) based on the subbands of the resource group size indicated by the control information.

FIG. 33 depicts a reference signal receiving procedure based on control information notifying a resource group size in a wireless communication system according to an embodiment of the present invention. FIG. 33 illustrates an operating method of the terminal 120.

Referring to FIG. 33, the terminal receives control information notifying a resource group size corresponding to control information of reference signals in step 3301. The resource group size indicates the number of subbands to which one control information is applied. The control information can be received through an RRC message or as a DCI over a control channel of the subframe. Also, the control information can include allocation information of the reference signals, for example, an antenna port, a CDM group, and the like. That is, the control information includes a parameter indicating how many subbands the allocation information is applied to.

Next, the terminal transmits reference signals in step 3303. In so doing, the terminal applies the same allocation information in subbands of the resource group size indicated by the control information. That is, the terminal can determine a resource unit for applying the same parameter based on the resource group size, and detect at least one reference signal received in the resource unit based on the same parameter. Specifically, the terminal can apply different configurations (e.g., CDM group, antenna port) based on the subbands of the resource group size indicated by the control information.

Figure 34A:
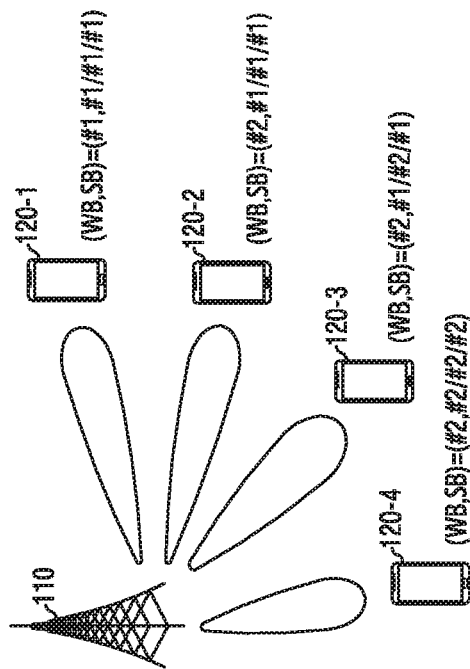
FIGS. 34A and 34B depict a configuration of control information divided based on an application range in a wireless communication system according to an embodiment of the present invention.
Figure 34B:
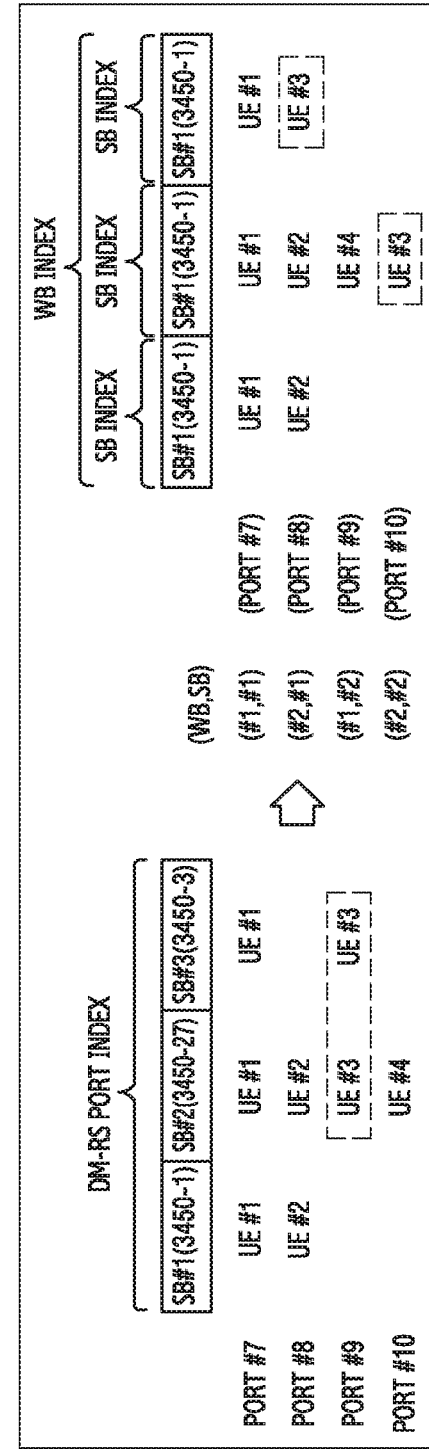

According to another embodiment of the control information configuration for the reference signals, the control information is divided according to an application range in FIGS. 34A and 34B. FIGS. 34A and 34B depict a configuration of control information divided based on an application range in a wireless communication system according to an embodiment of the present invention.

Referring to FIG. 34A, a base station 110 communicates with terminals 120-1 through 120-4. In so doing, the base station 110 transmits control information for reference signals, that is, reference signal information. The control information can include a combination of SB information and WB information. The SB information includes a first portion of control information applied on the subband unit, and the WB information includes a second portion of control information applied based on a plurality of subband units. For example, the WB information can designate the order in the CDM group, and the SB information can designate the CDM group. For example, the control information can be configured as shown in Table 8.

TABLE 8

| Port index | WB information | SB information |
|---|---|---|
| 7 | 1 | 1 |
| 8 | 2 | 1 |
| 9 | 1 | 2 |
| 10 | 2 | 2 |

For example, referring to FIG. 34A, for the terminal 120-1, a first CDM group is allocated in a subband #1 3450-1, the first CDM group is allocated in a subband #2 3450-2, and the first CDM group is allocated in a subband #3 3450-3. Accordingly, the SB information for the terminal 120-1 is set to "#1/#1/#1". Also, with respect to the subbands 3450-1 through 3450-3, since a port (e.g., a port 7) of the first order in the first CDM group is allocated to the terminal 120-1, the WB information for the terminal 120-1 is set to "#1".

Also, referring to FIG. 34B, in case of the whole subband unit reference signal port allocation depicted on the left side, since the terminal 120-3 is allocated the port 9 in the subband #3 3450-3, the resource of the port 8 is wasted. However, according to an embodiment of the present invention depicted on the right side, the terminal 120-3 can use the port 10 or the port 8 per subband. That is, the reference signal resource can be used more effectively.

Figure 35:
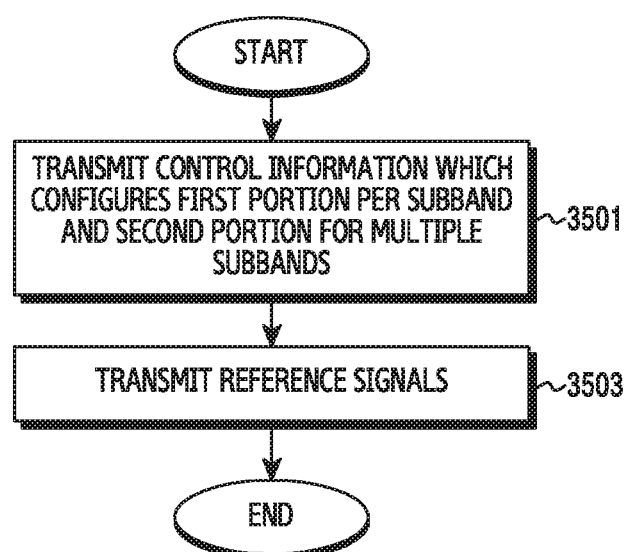
FIG. 35 depicts a reference signal transmitting procedure based on control information divided based on an application range in a wireless communication system according to an embodiment of the present invention.
Figure 36:
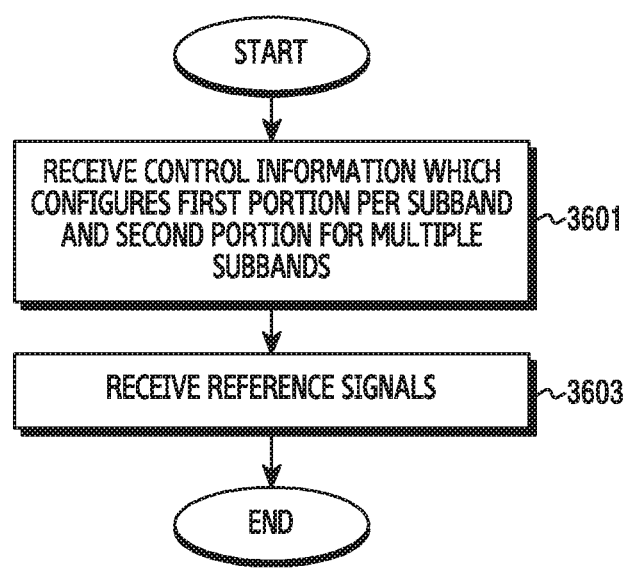
FIG. 36 depicts a reference signal receiving procedure based on control information divided based on an application range in a wireless communication system according to an embodiment of the present invention.

When the control information is configured as shown in FIGS. 34A and 34B, the base station can operate as shown in FIG. 35 and the terminal can operate as shown in FIG. 36.

FIG. 35 depicts a reference signal transmitting procedure based on control information divided based on an application range in a wireless communication system according to an embodiment of the present invention. FIG. 35 illustrates an operating method of the base station 110.

Referring to FIG. 35, the base station transmits control information which configures a first portion per subband and a second portion for a plurality of subbands in step 3501. That is, the first portion is applied to each subband, and the second portion includes a parameter applied to the subbands in common. For example, the second portion can include a parameter applied to the whole subband. The control information can be transmitted through an RRC message or in the form of DCI over a control channel of a subframe.

Next, the base station transmits reference signals in step 3503. In so doing, the base station applies the parameters indicated by the first portion and the second portion of the control information. In so doing, the base station applies at least one parameter of the second portion to the subbands in common, and applies at least one parameter of the first portion to each subband. For example, the first portion can designate a CDM group, and the second portion can designate the order in the CDM group.

FIG. 36 depicts a reference signal receiving procedure based on control information divided based on an application range in a wireless communication system according to an embodiment of the present invention. FIG. 36 illustrates an operating method of the terminal 120.

Referring to FIG. 36, the terminal receives control information which configures a first portion per subband and a second portion for a plurality of subbands in step 3601. That is, the first portion is applied to each subband, and the second portion includes a parameter applied to the subbands in common. For example, the second portion can include a parameter applied to the whole subband. The control information can be received through an RRC message or in the form of DCI over a control channel of a subframe.

Next, the terminal receives reference signals in step 3603. In so doing, the terminal applies the parameters indicated by the first portion and the second portion of the control information. In so doing, the terminal applies at least one parameter of the second portion to the subbands in common, and applies at least one parameter of the first portion to each subband. That is, the terminal determines the parameter per subband by combining the first portion and the second portion, and detects the reference signals based on the parameter per subband.

For example, the first portion can designate a CDM group, and the second portion can designate the order in the CDM group.

According to yet another embodiment of the present invention for the control information configuration for the reference signals, the control information only for all of the subbands and the control information according to an embodiment of the present invention can be selectively used. Herein, the control information according to an embodiment of the present invention includes one of the control information per subband, the control information per resource group, and the control information divided to the WB information and the SB information. For example, the system can define the port information of the two types in different DCI formats, and the terminal can interpret the two DCI formats respectively and thus concurrently perform the detection. The terminal can determine the DCI format of the successful detection as the reference signal port information transmitted by the base station. In this case, the base station can determine whether to configure the reference signal port information for all of the subbands or per subband based on a pairing situation of the MU-MIMO terminals and a control level aggregation level per terminal.

The methods according to embodiments described in the claims or the specification of the present invention can be implemented in hardware, software, or a combination of hardware and software.

As for the software implementation, a computer-readable storage medium storing one or more programs (software modules) can be provided. One or more programs stored in the computer-readable storage medium can be configured for execution by one or more processors of an electronic device. One or more programs can include instructions for enabling the electronic device to execute the methods according to the embodiments described in the claims or the specification of the present invention.

Such a program (software module, software) can be stored to a random access memory, a non-volatile memory including a flash memory, a Read Only Memory (ROM), an Electrically Erasable Programmable Read Only Memory (EEPROM), a magnetic disc storage device, a compact Disc (CD)-ROM, Digital Versatile Discs (DVDs) or other optical storage devices, and a magnetic cassette. Alternatively, the program can be stored to a memory combining part or all of those recording media. Also, a plurality of memories may be included.

Also, the program can be stored in an attachable storage device accessible via a communication network such as Internet, Intranet, Local Area Network (LAN), Wide LAN (WLAN), or Storage Area Network (SAN), or a communication network by combining these networks. Such a storage device can access the device which carries out an embodiment of the present invention through an external port. Also, a separate storage device on the communication network may access the device of the present invention.

In the specific embodiments of the present invention, the elements included in the invention are expressed in a singular or plural form. However, the singular or plural expression is appropriately selected according to a proposed situation for the convenience of explanation, and the present invention is not limited to a single element or a plurality of elements. The elements expressed in the plural form may be configured as a single element and the elements expressed in the singular form may be configured as a plurality of elements.

While the specific embodiment has been described in the specification of the present invention, it will be understood that various changes can be made therein without departing from the scope of the present. Therefore, the scope of the invention is not limited to the described embodiments but is defined by the scope of the claims to be explained and their equivalents.

What is claimed is:

1. A method performed by a terminal in a wireless communication system, the method comprising:
receiving, from a base station, information regarding a configuration for a reference signal; and
receiving, from the base station, the reference signal based on the configuration,
wherein the information comprises a value indicating a combination of at least one port allocated to the terminal and a length of an orthogonal code.

2. The method of claim 1, wherein the at least one port comprises at least one of a first port, a second port, a third port, or a fourth port,
   wherein the length of the orthogonal code is indicated as one of at least one candidate value including a first length value or a second length value,
   wherein the first length value is used as a first candidate value for the first port or the second port, and
   wherein the second length value is used as a second candidate value for the first port, the second port, the third port, or the fourth port.

3. The method of claim 2, wherein, if a port 7 or a port 8 is allocated to the terminal, the information indicates the length of the orthogonal code with the first length value or the second length value, and
   wherein, if a port 11 or a port 13 is allocated to the terminal, the information indicates the length of the orthogonal code with the second length value.

4. The method of claim 3, wherein the first length value is 2, and
   wherein the second length value is 4.

5. The method of claim 1, wherein the at least one port comprises at least one of a port 7, a port 8, a port 11, or a port 13.

6. The method of claim 1, wherein the value further indicates a number of layers allocated to the terminal.

7. The method of claim 1, wherein the length of the orthogonal code is determined based on a number of multiplexed terminals.

8. The method of claim 1, wherein the terminal is capable of interpreting orthogonal codes of a first length and orthogonal codes of a second length that is greater than the first length, and, when the terminal is multiplexed with another terminal incapable of interpreting orthogonal codes of the second length, an orthogonal code allocated to the terminal has orthogonality with an orthogonal code allocated to the other terminal within a range of the first length.

9. The method of claim 1, wherein the reference signal is precoded identically with data signals transmitted to the terminal.

10. The method of claim 1, wherein the reference signal is transmitted on a same resource as a reference signal for another terminal spatially multiplexed, and
   the reference signal and the reference signal for the other terminal are separable by the orthogonal code.

11. The method of claim 1, wherein the information comprises first portion information applied to a plurality of subbands in common and second portion information applied per subband.

12. The method of claim 1, wherein the information comprises information indicating a power boosting value applied to the reference signal.

13. The method of claim 1, wherein the information comprises information indicating whether a reference signal for another multiplexing group is transmitted.

14. A terminal in a wireless communication system, the terminal comprising:
   a transceiver; and
   at least one processor coupled to the transceiver and configured to:
      receive, from a base station, information regarding a configuration for a reference signal; and
      receive, from the base station, the reference signal based on the configuration,
   wherein the information comprises a value indicating a combination of at least one port allocated to the terminal and a length of an orthogonal code.

15. The terminal of claim 14, wherein the at least one port comprises at least one of a first port, a second port, a third port, or a fourth port,
   wherein the length of the orthogonal code is indicated as one of at least one candidate value including a first length value or a second length value,
   wherein the first length value is used as a first candidate value for the first port or the second port, and
   wherein the second length value is used as a second candidate value for the first port, the second port, the third port, or the fourth port.

16. The terminal of claim 15, wherein, if a port 7 or a port 8 is allocated to the terminal, the information indicates the length of the orthogonal code with the first length value or the second length value, and
   wherein, if a port 11 or a port 13 is allocated to the terminal, the information indicates the length of the orthogonal code with the second length value.

17. The terminal of claim 16, wherein the first length value is 2, and
   wherein the second length value is 4.

18. The terminal of claim 14, wherein the at least one port comprises at least one of a port 7, a port 8, a port 11, or a port 13.

19. The terminal of claim 14, wherein the value further indicates a number of layers allocated to the terminal.

20. A base station in a wireless communication system, the base station comprising:
   a transceiver configured to:
      transmit, to a terminal, information regarding a configuration for a reference signal; and
      transmit, to the terminal, the reference signal to the terminal based on the configuration,
   wherein the information comprises a value indicating a combination of at least one port allocated to the terminal and a length of an orthogonal code.

* * * * *